(12) United States Patent
Bar-Aviv et al.

(10) Patent No.: US 8,605,970 B2
(45) Date of Patent: Dec. 10, 2013

(54) DENOISING MEDICAL IMAGES

(75) Inventors: Ezer Bar-Aviv, Tiberias (IL); Zvi Devir, Haifa (IL); Eliran Dahan, Haifa (IL); Tal Kenig, Haifa (IL); Guy Rosman, Haifa (IL)

(73) Assignee: Medic Vision-Imaging Solutions Ltd., Tirat Hacarmel (IL)

( * ) Notice: Subject to any disclaimer, the term of this patent is extended or adjusted under 35 U.S.C. 154(b) by 212 days.

(21) Appl. No.: 13/142,282

(22) PCT Filed: Dec. 24, 2009

(86) PCT No.: PCT/IL2009/001216
§ 371 (c)(1), (2), (4) Date: Jun. 27, 2011

(87) PCT Pub. No.: WO2010/073251
PCT Pub. Date: Jul. 1, 2010

(65) Prior Publication Data
US 2011/0268328 A1  Nov. 3, 2011

Related U.S. Application Data

(60) Provisional application No. 61/219,857, filed on Jun. 24, 2009.

(30) Foreign Application Priority Data

Dec. 25, 2008  (WO) .................. PCT/IL2008/001679

(51) Int. Cl.
*G06K 9/00* (2006.01)
*A61B 6/00* (2006.01)

(52) U.S. Cl.
USPC .............................. 382/128; 378/4

(58) Field of Classification Search
USPC .............. 382/128–134; 378/4, 8, 21–27, 101, 378/901; 600/407, 410, 425, 427, 336, 411; 128/920, 922
See application file for complete search history.

(56) References Cited

U.S. PATENT DOCUMENTS

| | | | | |
|---|---|---|---|---|
| 7,443,954 | B2 * | 10/2008 | Meyer | 378/98.3 |
| 7,627,158 | B2 * | 12/2009 | Hay | 382/131 |
| 7,840,249 | B2 * | 11/2010 | Wang et al. | 600/407 |
| 7,894,567 | B2 * | 2/2011 | Hagiwara | 378/4 |

* cited by examiner

*Primary Examiner* — Abolfazl Tabatabai
(74) *Attorney, Agent, or Firm* — Mark M. Friedman

(57) ABSTRACT

A method of producing a denoised medical image at a specified resolution, comprising: a) denoising an original medical image acquired at a resolution higher than the specified resolution; and b) reducing the resolution of the image, after denoising, to the specified resolution, using a nonlinear resolution reduction procedure that preserves more fine detail in the image than a linear resolution reduction procedure would.

27 Claims, 9 Drawing Sheets

DENOISING MEDICAL IMAGES

RELATED APPLICATIONS

This Application claims benefit under 35 U.S.C. §119(e) from U.S. Provisional Patent Application No. 61/219,857, filed on Jun. 24, 2009. This Application also claims priority from PCT Patent Application No. PCT/IL2008/001679, filed on Dec. 25, 2008, and published as WO2009/081410, which claims benefit under 35 U.S.C. §119(e) from U.S. Provisional Patent Application No. 61/016,578, filed on Dec. 25, 2007. The contents of all of the above documents are incorporated by reference as if fully set forth herein.

FIELD AND BACKGROUND OF THE INVENTION

The present invention, in some embodiments thereof, relates to a method and system for processing medical images to produce images with reduced noise and other desirable characteristics, more particularly, but not exclusively, to a method of processing CT images that takes into account non-uniform distribution of noise in the image, and/or uses nonlinear filters to retain fine detail.

E. H. Adelson, C. H. Anderson, J. R. Bergen, P. J. Burt and J. M. Ogden, "*Pyramid methods in image processing*", RCA Engineer, 29-6, November 1984, describes a method of fusing two images of a scene taken at different camera focus settings, using a Laplacian pyramid decomposition of the images.

Hui Li, B. S. Manjunath, and S. K. Mitra, "*Multi-sensor image fusion using the wavelet transform*," in Proceedings of IEEE International Conference on Image Processing, 1994, describes fusing different images of a same region, obtained using different types of sensors, using a wavelet transform instead of a Laplacian pyramid.

Yu Lifeng, Zu Donglin, Wan Weidong, and Bao Shanglian, "*Multi-Modality Medical Image Fusion Based on Wavelet Pyramid and Evaluation*," a report published by the Institute of Heavy Ion Physics, Peking University, Beijing 100871, China (2001), describes a method of fusing two medical images obtained using different imaging modalities, for example CT and MRI, or PET and MRI, using a wavelet pyramid.

Hassam El-Din Moustafa and Sameh Rehan, "*Applying Image Fusion Techniques for Detection of Hepatic Lesions*," Proceedings of the 6th WSEAS International Conference on Wavelet Analysis & Multirate Systems, Bucharest, Romania, Oct. 16-18, 2006, pages 41-44, compares the results of fusing a CT and an MRI image, using different methods, including the Laplacian pyramid, the wavelet transform, the Computationally Efficient Pixel-level Image Fusion method, and the Multi-focus Technique based on Spatial Frequency.

Richard Alan Peters II, "*A New Algorithm for Image Noise Reduction using Mathematical Morphology*", IEEE Trans. Image Processing 4, 554-568 (1995), describes a morphological image cleaning algorithm that preserves thin features while removing noise. The method calculates residual images on a number of different scales via a morphological size distribution, and discards regions in the various residuals that it judges to contain noise, provided the noise has a smaller dynamic range than the thin features.

US2008/0310695 to Garnier et al, describes a method of denoising an MRI image using a locally adaptive nonlinear noise filter, taking into account the spatial variation of noise level theoretically expected in the MRI image.

US2008/0118128 to Toth, describes generating a simulated image that has a predetermined amount of artificially generated noise added to it.

The following publications and patents relate generally to image processing noise reduction, image acquisition and/or computer vision:

US 2007/053477—Method and apparatus of global de-noising for cone beam and fan beam CT imaging;

KR 2005-0031210—Method and apparatus of image denoising;

JP 2000-050109—Nonlinear image filter for removing noise;

U.S. Pat. No. 6,459,755—Method and apparatus for administrating low dose CT scans;

US 2003/099405—CT dose reduction filter with a computationally efficient implementation;

EP 1 774 837—Active dose reduction device and method;

JP 2001-39874—Magnetic field generator for MRI;

WO 2007/047599—Method and apparatus for high gain magnetic resonance;

Steven Haker, Lei Zhu, Allen Tannenbaum, and Sigurd Angenent, "*Optimal Mass Transport for Registration and Warping*", International Journal of Computer Vision, Volume 60, Issue 3 (December 2004), Pages 225-240;

Yossi Rubner, Carlo Tomasi, and J. Leonidas Guibas, "*A Metric for Distributions with Applications to Image Databases*", ICIP 1998, Pages 59-66;

Belongie Serge, Jitendra Malik, and Puzicha Jan, "*Shape Matching and Object Recognition Using Shape Contexts*", IEEE T-PAMI, Volume 24, No. 4, (April 2002);

Robert Osada, Thomas Funkhouser, Bernard Chazelle, and David Dobkin, "*Matching 3D Models with Shape Distributions*", Proceedings of the International Conference on Shape Modeling & Applications 2001, Pages 154-166;

P. J. Burt and E. H. Adelson, "*The Laplacian Pyramid as a Compact Image Code*", IEEE Trans. on Communications, pp. 532-540, April 1983;

Iddo Drori, Daniel Cohen-Or, and Hezy Yeshurun, "*Fragment based image completion*", ACM Transactions on Graphics 22(3), (Proc. of SIGGRAPH 2003), 303-312;

John Goutsias and Henk J. A. M. Heijmans, "*Nonlinear Multiresolution Signal Decomposition Schemes—Part I: Morphological Pyramids*", IEEE Trans. on Image Processing, Vol. 9, No. 11, November 2000;

John Goutsias and Henk J. A. M. Heijmans, "*Nonlinear Multiresolution Signal Decomposition Schemes—Part II: Morphological Wavelets*", IEEE Trans. on Image Processing, Vol. 9, No. 11, November 2000;

Jean Serra, "*Image Analysis and Mathematical Morphology*", 1982;

A. J. Britten, M. Crotty, H. Kiremidjian, A. Grundy, and E. J. Adam, "*The addition of computer simulated noise to investigate radiation dose and image quality in images with spatial correlation of statistical noise: an example application to X-ray CT of the brain*", The British Journal of Radiology, 77 (2004), 323-328;

C. Tomasi and R. Manduchi, "*Bilateral filtering for gray and color images*", in Proceedings of the 6th International Conference in Computer Vision (ICCV), 1998, pp. 839-846;

J. Weickert, "*Coherence-Enhancing Diffusion Filtering*", International Journal of Computer Vision, 31(2-3), pp. 111-127, 1999;

A. Buades, B. Coll, and J.-M. Morel, "*On image denoising methods*", Centre de Mathématiques et de Leurs Applications (CMLA) publication No. 2004-15, 2004;

P. Coupé et al, "*Fast Non Local Means Denoising for 3D MR Images,*" 9th International Conference on MICCAI 2006, R. Larsen, M. Nielsen, J. Sporring (eds.), Lecture Notes in Computer Science, Vol. 4191, pp. 33-40, Copenhagen, Denmark, October 2006;

M. Mahmoudi and G. Sapiro, "*Fast Image and Video Denoising via Nonlocal Means Of Similar Neighborhoods*," IEEE Signal Processing letters 12, 839-842 (2005);

A. Heiderzadeh and A. N. Avanaki, "*An Enhanced Nonlocal-Means Algorithm for Image Denoising*," Proc. IEEE $9^{th}$ International Symposium on Signal Processing and its Applications (ISSPA'07), pp. 1-4, Sharjah, UAE, 2007;

N. Azzabou et al, "*Image Denoising Based on Adaptive Dictionary Computation*," Proceedings of IEEE International Conference on Image Processing, 2007.

SUMMARY OF THE INVENTION

Some aspects of some embodiments of the invention concern a method and system for processing a medical image, such as a CT image, to produce an output image with certain desired characteristics, including one or more of reduced noise, an expected level and spatial distribution of noise, an expected resolution, and/or fine detail and structure that is retained when noise and/or resolution are reduced.

There is thus provided, in accordance with an exemplary embodiment of the invention, a method of producing a denoised medical image at a specified resolution, comprising:

a) denoising an original medical image acquired at a resolution higher than the specified resolution; and b) reducing the resolution of the image, after denoising, to the specified resolution, using a nonlinear resolution reduction procedure that preserves more fine detail in the image than a linear resolution reduction procedure would.

Optionally, the original medical image is a three-dimensional image comprising slices of an original thickness, and reducing the resolution comprises fusing multiple slices using the nonlinear procedure to obtain an image with thicker slices.

Optionally, the nonlinear procedure comprises:

a) decomposing the thinner slices into band-pass components;

b) for at least some of the band-pass components, combining the thinner slice components into thicker slice components in a way that, at least sometimes, gives more weight to a thinner slice component for which the component has a higher amplitude; and c) re-assembling the thicker slice band-pass components for each thicker slice, to produce the image at the specified resolution.

Optionally, combining the thinner slice components into thicker slice components in a way that gives more weight to a thinner slice component for which the component has a higher amplitude, is done at least for band-pass components other than the component containing the lowest frequency content, when, for that band-pass component and among all of the thinner slices being combined into the same thicker slice, a thinner slice component with a greatest absolute value has an absolute value that is below a threshold value.

Additionally or alternatively, the original medical image is a three-dimensional image comprising slices arranged in a slice direction, and reducing the resolution comprises reducing the resolution in the slice direction, but not reducing the resolution in directions along each slice.

Optionally, the nonlinear resolution reduction procedure comprises a band-pass decomposition procedure.

Optionally, the band-pass decomposition procedure comprises a Laplacian pyramid procedure.

Alternatively, the band-pass decomposition procedure comprises a wavelet transform procedure.

Optionally, denoising the original medical image comprises:

a) for each pixel being examined in the image, selecting a set of search pixels;

b) calculating a value of at least one feature of a neighborhood of each search pixel, and a value of corresponding features of a neighborhood of the pixel being examined;

c) calculating a value of at least one other feature of the same or a different neighborhood of each search pixel, and a value of corresponding feature of the same or a different neighborhood of the pixel being examined; and d) calculating a reduced noise grey value for each pixel being examined, based on raw or transformed grey values of its search pixels, with greater sensitivity to those with one or more feature values similar to those of the pixel being examined.

There is further provided, in accordance with an exemplary embodiment of the invention, a system for producing a denoised medical image at a specified resolution, comprising:

a) a medical imaging device for acquiring raw data for a 3-D medical image, capable of achieving at least a higher resolution than the specified resolution;

b) a controller programmed to reconstruct slices of the image from the raw data, at the higher resolution, to denoise the image, and to reduce the resolution of the denoised image to the specified resolution by fusing thinner slices to form thicker slices, using a nonlinear procedure that comprises:

i) decomposing the thinner slices into band-pass components;

ii) for at least some of the band-pass components, combining the thinner slice components into thicker slice components in a way that, at least sometimes, gives more weight to a thinner slice component for which the component has a higher amplitude; and iii) re-assembling the thicker slice band-pass components for each thicker slice, to produce the image at the specified resolution.

There is further provided, in accordance with an exemplary embodiment of the invention, a method of restoring removed structures to a denoised medical image, comprising:

a) denoising an original medical image to produce the denoised image;

b) finding a residual image that depends on differences between the denoised and original images;

c) applying a nonlocal smoothing filter to the residual image to obtain a filtered residual image which indicates a degree of structure as a function of position in the residual image; and d) restoring structure by changing a grey value of each voxel in the denoised image by an amount which depends on the degree of structure at a corresponding location in the residual image, and on a grey value at a corresponding location in the residual image or the filtered residual image.

Optionally, restoring structure comprises adding to the denoised image the weighted or unweighted filtered residual image.

Optionally, the method also includes finding a measure of the degree of structure as a function of position in the residual image, from the filtered residual image, wherein restoring structure comprises adding to the denoised image the residual image or the filtered residual image weighted by an adaptive parameter that depends locally on the measure of the degree of structure as a function of position.

Optionally, finding the measure of the degree of structure as a function of position in the residual image, comprises finding one or more eigenvalues of a structure tensor, a Hessian matrix, or both.

Optionally, the nonlocal smoothing filter comprises a nonlinear edge-preserving filter.

Optionally, the nonlinear edge-preserving filter comprises a nonlinear anisotropic diffusion filter.

Optionally, the nonlinear anisotropic diffusion filter comprises a Beltrami flow filter.

Alternatively or additionally, the nonlinear anisotropic diffusion filter comprises a coherence enhancement diffusion (CED) filter.

Optionally, for most positions, the change in grey value is more sensitive to the grey value of the residual image or the filtered residual image or both, at positions where the degree of structure is greater, than it is at positions where the degree of structure is smaller.

There is further provided, in accordance with an exemplary embodiment of the invention, a system for producing a denoised medical image with removed structure restored to it, comprising:

a) a medical imaging device for acquiring raw data for medical images;

b) a controller programmed to reconstruct a medical image from the raw data, to denoise the image, to find a residual image that depends on differences between the denoised and original images, to apply a nonlocal smoothing filter to the residual image to obtain a filtered residual image which indicates a degree of structure as a function of position in the residual image, and to restore structure by changing a grey value of each voxel in the denoised image by an amount which depends on the degree of structure at a corresponding location in the residual image, and on a grey value at a corresponding location in the residual image or the filtered residual image.

There is further provided, in accordance with an exemplary embodiment of the invention, a method of producing a denoised medical image with a specified magnitude and distribution of noise, comprising:

a) removing noise from an original medical image to produce an initial denoised image; and b) adding a portion of the removed noise to the initial denoised image to produced a denoised image with about the specified magnitude and spatial distribution of noise.

Optionally, adding a portion of the removed noise comprises a) choosing a spatially varying weighting parameter which will achieve the specified magnitude and distribution of noise; and b) finding a weighted sum of the original image and the initial denoised image, according to the weighting parameter.

Optionally, choosing the spatially varying weighting parameter comprises calculating local standard deviations of the original image and the initial denoised image.

Optionally, removing noise from the original medical image comprises restoring removed structures to the initial denoised image according to an exemplary embodiment of the invention.

Optionally, adding noise comprises adding the original image multiplied by a spatially varying parameter (or envelope) that depends on the specified magnitude and distribution of noise.

There is further provided, in accordance with an exemplary embodiment of the invention, a system for producing a denoised medical image with a specified magnitude and distribution of noise, comprising:

a) a medical imaging device for acquiring raw data for medical images;

b) a controller programmed to reconstruct a medical image from the raw data, to denoise the image, and to add a portion of the removed noise to the initial denoised image to produced a denoised image with about the specified magnitude and spatial distribution of noise.

There is further provided, in accordance with an exemplary embodiment of the invention, a method of denoising a medical image, comprising:

a) for each of a plurality of selected voxels in the image, estimating a noise level in a large neighborhood surrounding the voxel, by:

i) for at least some voxels in the large neighborhood that fall within a chosen range of grey levels, finding a degree of variation in grey level in a small neighborhood around the voxel;

ii) finding a subset of the voxels for which the degree of variation in grey level is below a chosen quantile among the voxels for which the degree of variation was found; and iii) setting the noise level equal to an average of the degrees of variation for the voxels in the subset;

b) finding noise level as function of position in the image, from the estimated noise levels for the selected voxels; and c) denoising the image, using a denoising algorithm that makes use of the noise level as a function of position.

There is further provided, in accordance with an exemplary embodiment of the invention, a method of denoising a medical image using a known noise level as a function of position in the image, comprising, for each voxel in the image:

a) choosing a set of comparison voxels for said voxel;

b) calculating a similarity measure between a neighborhood associated with said voxel and a neighborhood associated with each comparison voxel;

c) finding a weighted average of the grey levels of the comparison voxels, the weight for each comparison voxel depending on the similarity measure for its neighborhood, normalized to a value that depends on the noise level at the position of said voxel, the noise level at the position of the comparison voxel, or both; and d) changing the grey level of said voxel according to the weighted average of the grey levels of the comparison voxels.

Optionally, calculating the similarity measure comprises calculating a value of a feature of the neighborhood of said voxel and calculating a value of a corresponding feature of the neighborhood of the comparison voxel.

There is further provided, according to an exemplary embodiment of the invention, a method of sharpening a medical image, comprising:

a) measuring a local degree of variation in grey values of the image, as a function of position in the image; and b) applying a sharpening filter to the image, wherein a degree of sharpening produced by the filter is lower at positions with higher measured degree of variation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1A:
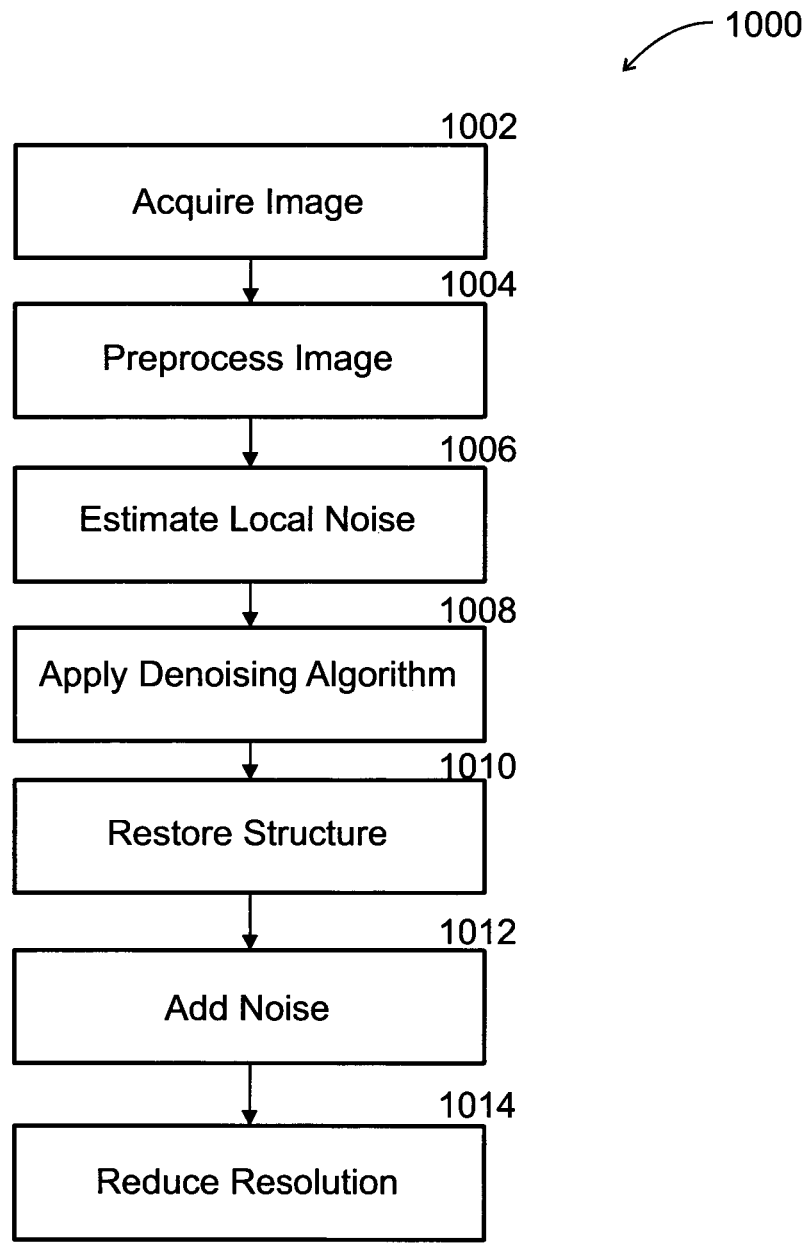
FIG. 1A shows a flowchart for a method of denoising a medical image, according to an exemplary embodiment of the invention.

The present invention, in some embodiments thereof, relates to a method and system for processing medical images to produce images with reduced noise and other desirable characteristics, more particularly, but not exclusively, to a method of processing CT images that takes into account non-uniform distribution of noise in the image, and/or uses nonlinear filters to retain fine detail.

An aspect of some embodiments of the invention concerns a method of denoising a medical image, where the denoising is done at a high spatial resolution, for example the spatial resolution at which the original image is acquired, for example by a CT machine. The denoised image is then converted down to a lower resolution, optionally using a nonlinear down-sampling algorithm that preserves fine detail better than a linear down-sampling algorithm would. The lower resolution is, for example, a resolution at which radiologists typically examine CT images. In typical prior art denoising procedures, denoising is performed on an image after it has been converted to lower resolution.

An aspect of some embodiments of the invention concerns a method of restoring structure to a denoised image, in which the denoising algorithm may have removed some structure from the image in addition to removing noise. A residual image, a difference between the original and denoised image, optionally filtered to remove noise and enhance edges, is added back, fully or in part, to the denoised image. In an exemplary embodiment of the invention, at each location in the image, the relative weight used for the residual image depends on a degree of structure in the residual image, or in the original or denoised image, at that location. For example, at a location where there is a low degree of structure, the residual image may be given little or no weight, while at a location where there is a high degree of structure, the residual image may be given a relatively large amount of weight, and optionally the residual image is given a maximum weight which changes little or not at all for further increases in the degree of structure. Optionally, the relative weight used for the residual image also depends on a local level of noise at each location in the original or residual image, for example using a lower weight for the residual image where there is a higher level of noise.

An aspect of some embodiments of the invention concerns a method of producing a denoised image, with a specified magnitude and distribution of noise. For example, the specified magnitude and distribution of noise may be the magnitude and distribution of noise expected by radiologists when viewing a CT image, in order to make the image look more natural to them than a completely denoised image would look. The specified magnitude and distribution of noise is achieved by adding noise to the image, with a spatial envelope that will achieve the desired magnitude and distribution of noise. Optionally, the noise is added by averaging the original image with the denoised image, using a spatially varying weighting parameter.

An aspect of some embodiments of the invention concerns a method of denoising an image, in which the denoising algorithm uses a measure of the noise level as a function of position in the image. The noise level is found, for example, at a given voxel, by looking at a large window around that voxel. Within the large window, only voxels within a certain range of grey values are considered. The range optionally depends on the tissue being imaged, for example only voxels in a middle range for that tissue are considered. For each of those voxels, a local measure of variation in grey values, for example a standard deviation, is found within a small window. A subset of these measures of variation is taken, those with the measure of variation below a certain quantile, and the average of the measures of variation in the subset is taken, to find the local noise level for the large window. The noise level as a function of position in the image is found by using this procedure for a plurality of voxels distributed in the image, and optionally interpolating to cover the entire image. Once the noise level is known as a function of position in the image, it may be used with any of the other procedures described here, to optimize or improve the performance of the procedure locally, according to the local noise level.

An aspect of some embodiments of the invention concerns a method of denoising an image, in which a noise level as a function of position in the image is used in the denoising algorithm. The denoising algorithm is, for example, a "non-local means" (NLM) type of algorithm, in which a patch around a given voxel is compared to patches around comparison voxels elsewhere in the image, and a similarity measure is calculated for the two patches. An expected variation in the similarity measure due to noise is calculated, based on the local noise level at the given voxel, the local noise level at the comparison voxel, or both, and is used to normalize the similarity measure. In prior art NLM algorithms, a constant noise level independent of location of the voxels has been used to normalize the similarity measure. A weight is found for the comparison voxel, based on the normalized similarity measure, and a weighted average of the grey values of the comparison voxels is found. The grey value of the given voxel is then changed, based on the average grey values of the comparison voxels. Optionally, the noise level as a function of position is found by the procedure described above.

An aspect of some embodiments of the invention concerns a method of sharpening an image, in which a local degree of variation in grey values, for example a local standard deviation in grey values, is found as a function of position in the image. A sharpening filter is then applied to the image, but with the degree of sharpening depending on the local degree of variation in grey values. A lower degree of sharpening is used when the local degree of variation in grey values is greater. The resulting image may have relatively few visual artifacts, or no visual artifacts, at sharp edges, in contrast to a linear sharpening filter which may produce more visual artifacts for a given average degree of sharpening.

In general in the image processing literature, the term "pixel" is used for an element of a two-dimensional image, and "voxel" is used for an element of a three-dimensional image. Since methods described herein can generally be used for either two-dimensional or three-dimensional images, use of the terms "pixel" and "voxel" herein should not be understood to imply that the description is limited to the cases of two-dimensional or three-dimensional images. Rather, unless otherwise specified, the terms "pixel" and "voxel" as used herein may generally be understood to be generic terms that apply to either case, and they are often used interchangeably.

In medical imaging modalities, such as CT or MRI, it is customary, when displaying an image, to map the image density, for example the density in Hounsfield Units (HU) in a CT image, to a brightness level or grey value ranging from black to white, for a particular range of densities of interest. The term "grey value" is sometimes used herein to refer to the image density, rather than to a brightness level representing that image density in a display, and this usage may be used even if the image density is outside the range mapped to brightness levels between black and white. The term "grey value" may also be used to refer to an image density, outside the range of image densities for the imaging modality, that is generated at an intermediate step of image processing, for example a negative number. In addition, the term "grey value" as used herein can refer not only to the brightness level of a black and white image, but also to the level of any color variable in a color image, for example the red, green or blue intensity in a color image, or the brightness or saturation level of a color image. In medical images such as CT or MRI images, usually only a single density variable is displayed, such as density in HU, or $T_1$ or $T_2$ weighted density, which is mapped to a brightness level of a grayscale display, and in this case "grey value" is particularly apt, but the methods described herein are not limited in their applicability to medical images or to black and white images.

The noise reduction methods described herein may be especially useful for medical images, since medical images tend to have relative high noise levels because there is often a tradeoff between noise level and image acquisition parameters, such as x-ray dose or MRI acquisition time, that impose an economic or safety penalty for lowering noise. Also, since medical images generally do not have differences in "lighting," features of the neighborhood of a pixel are often a good indication of its true grey value. This is especially true because medical images tend to have similar structures repeated in different parts of the image, sometimes with changed scales or orientations.

The methods described herein may be applied, for example, on an image acquisition device or its workstation (e.g., CT, MRI machine, ultrasound imager), on an image processing station and/or via network connection to a remote location/server.

Before explaining at least one embodiment of the invention in detail, it is to be understood that the invention is not necessarily limited in its application to the details set forth in the following description. The invention is capable of other embodiments or of being practiced or carried out in various ways.

Overview of Denoising Method

Referring now to the drawings, FIG. 1A shows a flowchart 1000, illustrating a procedure for producing an image with reduced noise, according to an exemplary embodiment of the invention. The procedure was developed for use with CT images, and will be described for use with CT images, but can also be used for other medical images, or with other types of images. Different types of medical images, as well as non-medical images, have different characteristics which may make a particular implementation of the procedure more suitable for them. Medical images such as CT and MRI images do not depend on "lighting" the way ordinary non-medical images do, and their level and spatial distribution of noise may be consistent and predictable from one image to another.

Figure 1B:
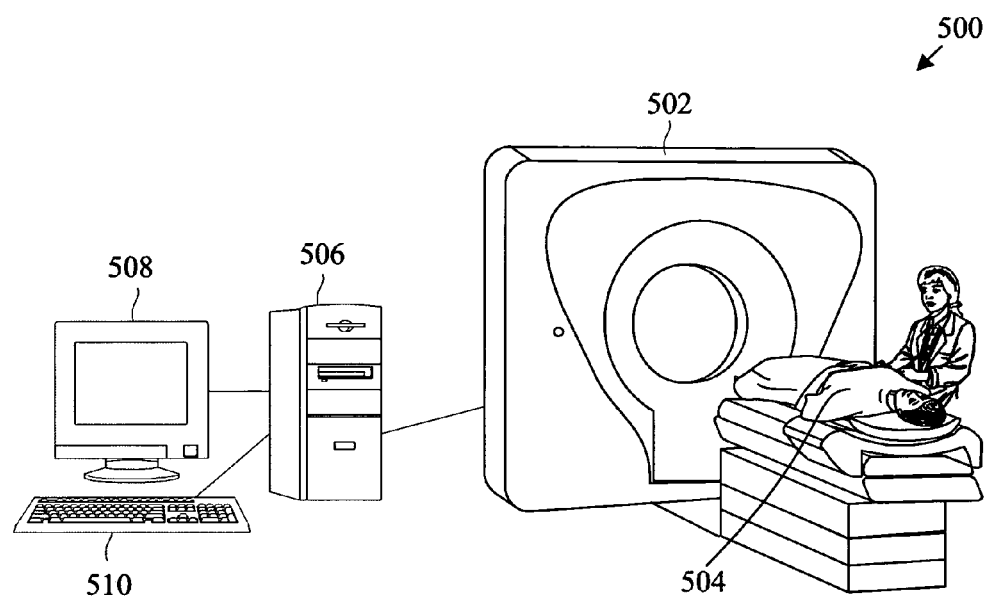
FIG. 1B schematically shows a medical imaging system for acquiring a medical image and denoising it according to the method of FIG. 1A.

At 1002, a high-resolution and noisy 3D original image I is acquired by a medical imaging device, such as a CT machine. A system 500 for acquiring and denoising such as image is schematically shown in FIG. 1B. The image is reconstructed from raw data acquired by an imaging device 502 from a patient 504, using a controller 506, for example a computer, or dedicated circuitry associated with the imaging device. The controller may also perform any or all of the denoising procedures described below. In some embodiments of the invention, physically separate computers or circuits may perform different parts of the denoising and/or image reconstruction procedures, but they are all referred to herein collectively as the controller. Optionally, an output device 508 such as a display monitor displays the denoised image, and an input device 510, such as a keyboard or console, is used to control the image processing and/or the imaging device.

Referring again to FIG. 1A, at 1004 original image I is optionally filtered using a non-linear filter, resulting in a preprocessed image denoted as C, which is later used for comparing patches in the denoising procedure. Since the density range of greatest interest in a regular CT image is generally relatively small, for example −50 HU to +100 HU (Hounsfield Units), where the full range is −1000 HU to +4000 HU, an optional range compression procedure can be carried out before the non-linear filtering of I. "Pre-whitening" of the image according to an expected noise model, defined below in section A under the heading "Preprocessed Image," is also optionally carried out.

In CT images, the noise is generally not uniform in space, due to the acquisition mechanism and beam hardening, a process by which the average energy of a non-monoenergetic beam of x-rays increases going through the body because softer x-rays are preferentially absorbed. Optionally, the denoising procedure uses spatially dependent parameters according to local noise characteristics at each point of the CT image, which are estimated at 1006. Optionally, the local noise characteristics are estimated before preprocessing the image, or in parallel with preprocessing the image. However, it may be advantageous to do the preprocessing first, for example, if the local noise characteristics are to be based on "whitened noise" in the preprocessed image rather than "colored noise" in the original image. These terms are defined below in section A under "Preprocessed Image."

A nonlocal means (NLM) type of denoising procedure is performed on the image at 1008. In general, an NLM procedure denoises a given voxel in the image by finding patches which are similar to the patch around the given voxel. The denoised value of the voxel is calculated as a weighed average of the central voxel of the patches, where the weight is proportional to some similarity metric between the patches. Other denoising procedures known in the art, other than NLM procedures, may also be used, instead of or in addition to NLM denoising procedures.

In a feature-based NLM procedure, the similarity metric is based on various features extracted from the patches, where the features may be based both on C and on I. The similarity metric may also depend on the parameters estimated at 1006. D is the denoised image after carrying out the feature-based NLM procedure. The NLM procedure used at 1008 may be either a feature-type NLM procedure, such as the feature-based NLM procedures described below under the heading, "Exemplary Types of Features Used in NLM Denoising Algorithm," and in related published PCT application WO2009/081410, or an NLM procedure of a type described in earlier literature on denoising images, such as that cited above.

At 1010, structure which may have been removed from the image in the denoising procedure is optionally restored to the image. Even after denoising, it may be possible to restore additional features from the residual image R=I−D, which contains mostly the removed noise but may also contain some spatially distinguishable structures. A Coherence Enhancement Diffusion (CED) or similar filter, which performs non-linear smoothing of the residual image, is optionally used to find those structures. Optionally, the filtered residual image S is not added directly to D, but may be multiplied by a parameter a which may depend on local characteristics of D. D'=D+ αS is the denoised image after restoration.

Noise is optionally added to the image at 1012. Denoised images sometimes look unnatural to radiologists who are used to a certain level of noise in CT images. An average between D' and I may look more natural to a radiologist. An example of such an image is E=βD'+(1−β) I, where β is chosen so that the resulting image E has a noise pattern of some specified standard deviation and β may vary over the image. Optionally, image D' is also saved, for a possible use later, in which the additional noise may be disadvantageous, for example if a radiologist wishes to zoom in on one part of the image at higher resolution.

The resolution of the image is optionally reduced at 1014. A radiologist typically examines a regular CT image at lower resolution than the resolution of the raw images acquired by the CT scanner. A final reduction in resolution is optionally performed using a non-linear resolution reduction procedure. The resolution reduction procedure is designed to preserve more details than linear filtering and sampling of the image.

Details of Denoising Method

Further details on each of the procedures of flowchart 100 are provided below.

Image Acquisition

In daily practice, CT images examined by a radiologist usually have an axial resolution (slice thickness) of approximately 2.5 mm. However, the native axial resolution of most modern CT machines is about 0.6 mm. Hence, the raw data acquired by the CT machine is of much higher resolution than that viewed by the clinician. The high resolution data is typically not utilized in daily practice due to the high noise level it contains and the longer reading time it requires. Each low resolution slice viewed in clinical routine contains data which is integrated from a number of slices in the original image.

The denoising procedure and associated image processing methods described here optionally use the high resolution data that is always available on the CT machine and contains more information. After the processing is completed, lower resolution images are optionally created, to be viewed by the radiologist.

In an exemplary embodiment of the invention, the difference between the clinical axial resolution and the original axial resolution is exploited in one or both of two ways: First, a richer dataset is used as input to the image processing algorithm. Due to the high information content, the algorithm is potentially capable of producing more accurate results. Second, the down-sampling of the processed image is optionally performed in a non-linear fashion to produce a lower resolution image, potentially preserving fine details available in the original image.

Preprocessed Image

In the preprocessing stage, a preprocessed image C is optionally calculated from the original image I. The preprocessed image is optionally used for comparison of the patches in the denoising procedure. A basic denoising algorithm can be written in the form $$\hat{x}_i = \frac{\sum_j x_j \cdot w(x_i, x_j)}{\sum_j w(x_i, x_j)},$$

Here $\hat{x}_i$ is the denoised value of the i-th voxel and weight $w(x_i, x_j)$ is a function of a feature-based distance between the patches around voxels $x_i$ and $x_j$ of I. A more general denoising algorithm optionally compares both patches of the original image I and patches of the preprocessed image C:

$$x_i = \frac{\sum_j x_j \cdot w(\{x_i, c_i\}, \{x_j, c_j\})}{\sum_j w(\{x_i, c_i\}, \{x_j, c_j\})}.$$

The preprocessed image C is optionally constructed from I using the following steps:

A. Pre-Whitening of the Colored Noise According to the Noise Model

CT noise can be approximately modeled as additive colored Gaussian noise, i.e. white Gaussian noise filtered by some filter which is denoted as the noise-coloring filter. Pre-whitening the image is optionally done by applying a Wiener filter which attempts to invert the operation of the noise-coloring, and thus produce an image containing white noise, which is not spatially correlated. This type of noise has been extensively studied in literature and may be easier to remove than colored noise.

The noise-coloring filter is optionally estimated by calculating the covariance matrix from a CT image of a uniform phantom, similar to a procedure described by A. J. Britten, M. Crotty, H. Kiremidjian, A. Grundy, and E. J. Adam, "*The addition of computer simulated noise to investigate radiation dose and image quality in images with spatial correlation of statistical noise: an example application to X-ray CT of the brain*", The British Journal of Radiology, 77 (2004), 323-328.

B. Range Compression

Figure 2:
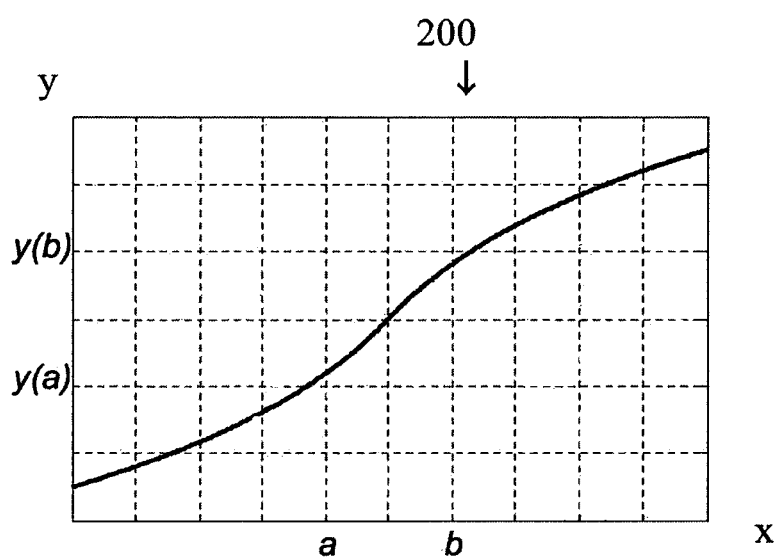
FIG. 2 show a plot of a range compression function optionally used in preprocessing a medical image, using the method of FIG. 1A.

The dynamic range of a CT image is typically between about −1000 HU (air) and +4000 HU (metal). However, the range between 0 HU and 100 HU is generally considered more important than, for example, the range between 1000 HU and 1500 HU, since the first range separates soft tissues, while the second range presents much denser tissues, such as bones. In addition, dense tissues such as bones are typically examined using a much wider window of densities, which causes the noise not to be so visible. Radiologists typically examine brain CT images with a density window of approximately 0 HU to +80 HU, and liver CT images with a density window of −15 HU to +155 HU. It may be advantageous to use a grey-level transformation on image C, which expands the soft tissue range while compressing the range of −1000 HU to −200 HU and above +300 HU. For example, the grey-level transformation can be the following function y of original density x $$x' \leftarrow 2 \cdot \frac{x-a}{b-a} - 1$$
$$y' \leftarrow \text{sign}(x') \cdot \log(1 + |x'|)$$
$$y \leftarrow y' \cdot \frac{b-a}{2} + a$$

where a and b are range constants and y is the transformed density. FIG. 2 shows a plot 200 of the range compression function y(x).

It should be noted that other grey-level transformation functions can be constructed and used as well. For example, suitable grey-level transformations may be obtained from stretching the histogram of the CT image, or equalizing the histogram of the CT image, optionally only the interesting parts in the image, for example without the surrounding air.

C. Robust Non-Linear Noise Removal

Optionally noise removal filters are applied to image C. The inventors have found that even if the noise removal filters make image C appear overly smooth visually, with some loss of resolution, the filtered image C may still be better than the unfiltered image C for purposes of comparing patches. Optionally, image C is used only for purposes of comparing patches, to evaluate the similarity metric, and the averaging operation is performed on the original image I, not on C.

Optionally, C is filtered using a bilateral filter such as those described by C. Tomasi and R. Manduchi, "*Bilateral filtering for gray and color images*", in Proceedings of the 6$^{th}$ International Conference in Computer Vision (ICCV), 1998, pp. 839-846. Alternatively or additionally, C is filtered using a Coherence Enhancement Diffusion (CED) filter, such as those described by J. Weickert, "*Coherence-Enhancing Diffusion Filtering*", International Journal of Computer Vision, 31(2-3), pp. 111-127, 1999, which also smooth the image while preserving the edges. Other types of noise removal filters known in the art may also be used.

Estimation of Local Noise Level

An important parameter of the non-local means denoising scheme, in accordance with an exemplary embodiment of the invention, is $\sigma_R$, which may control the weighting between different neighborhoods, given for example by $$w(\{x_i, c_i\}, \{x_j, c_j\}) \equiv W_{ij} = \exp\left(-\frac{d_P^2(i,j)}{\sigma_P^2} - \frac{\|C_i - C_j\|^2}{\sigma_R^2}\right),$$

where $C_x$ denotes an image patch around voxel x in the image C and $d_P(i,j)$ is the spatial distance between voxels i and j. Here $\|C_i - C_j\|$ denotes a measure of the difference between patches around voxels i and j, in image C.

It has been previously proposed in the literature that the value of $\sigma_R$ should be on the order of magnitude of the standard deviation in the variation of the measure due to noise; see e.g. A. Buades, B. Coll, and J.-M. Morel, cited above. This choice of weighting stems from the following heuristic observation. Two image patches which are similar up to the magnitude of statistical noise in the image will receive a large weight, indicating their similarity. On the contrary, two patches which bear dissimilarities beyond the difference expected from the noise in the image will receive low weights.

Traditionally, noise in the image is considered to be identically distributed, i.e. to have similar statistical characteristics at any spatial location within the image. Hence, $\sigma_R$ is usually determined once per image, and the same value is used for calculating weights at all spatial locations within the image.

In CT images the noise is typically not uniform in space, due to the acquisition mechanism and tomographic reconstruction algorithm. The inventors have found that a constant value for $\sigma_R$ across the entire image may not work well for CT images. This choice may lead to over-smoothing of less noisy image regions and insufficient denoising of image regions with higher noise levels. Instead, a spatially varying value is optionally used for $\sigma_R$, where, for example, each voxel within the image is assigned an appropriate value for $\sigma_R$, according to a local standard deviation of the measure due to noise.

An exemplary method for estimating the spatially dependent standard deviation due to noise is summarized as follows. First, the local standard deviation, or another measure of local variation in grey values, is calculated for each voxel in the original noisy image I. This is done by calculating the standard deviation (or other measure of variation) of a small neighborhood, for example 3×3×3 voxels, associated with the voxel being considered, for example containing the voxel being considered at its center. Then, a much larger neighborhood, for example 33×33×5 voxels, is examined around each voxel in the image. For each large neighborhood, some or all of the voxels within a certain density range, for example −50 HU to +150 HU, are extracted. Finally, the local standard deviation values of a subsample of the extracted voxels, which correspond for example to a local standard deviation lower than a certain quantile (for example 0.3) of local standard deviations of the extracted voxels within the large window, are averaged to yield an estimate of the local standard deviation due to noise.

Due to the use of a large neighborhood, the estimate of the local standard deviation due to noise is not expected to vary greatly between adjacent voxels. Optionally, the calculations are performed only on a subsample of all image voxels, and values at other locations are optionally found, if they are needed, by interpolating the calculated values using standard interpolation techniques.

Alternatively or additionally, other methods are used to estimate the local noise level, for example imaging a phantom and determining the noise level directly from a standard deviation of the grey levels in a uniform part of the phantom.

The value of $\sigma_R$ is set to a certain fraction, for example 0.54, of the estimate of the local standard deviation due to noise. Optionally, other parameters used in the denoising algorithm, or in other related image processing procedures, are also based on the estimate of the local standard deviation due to noise.

In some embodiments of the invention, $\sigma_R$, and/or any other parameter used in the denoising algorithm or related procedures, has the same value everywhere in the image, but that value depends on an average, over the image, of the local standard deviation due to noise, which is optionally calculated as described above. For example, only voxels within a certain density range are considered when finding the local standard deviation. And optionally, only local standard deviations below a certain quantile are included when calculating the average.

Exemplary NLM Denoising Algorithms

Figure 3A:
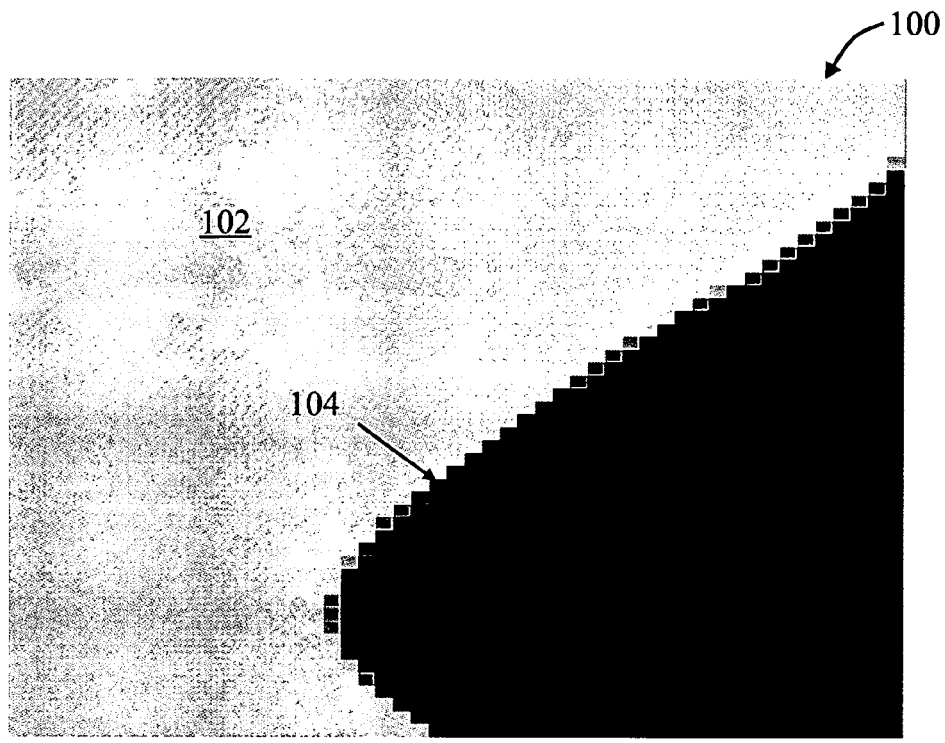
FIG. 3A schematically shows a two-dimensional image without noise, and FIG. 3B schematically shows the same image with noise added, and with a selected pixel and neighborhood, to illustrate an algorithm for reducing noise in an image which may be used in the method of FIG. 1A.

FIG. 3A shows a two-dimensional image 100 comprising an array of pixels, each with a numeric value which is mapped to a grey value between black and white. The grey value in a CT image represents a convenient mapping of the actual density of the imaged object, customarily in Hounsfield units (HU). In CT images of the brain, for example, the image is usually visualized such that 0 HU, which represents the density of water, is mapped to black and 70 HU to white.

Figure 3B:
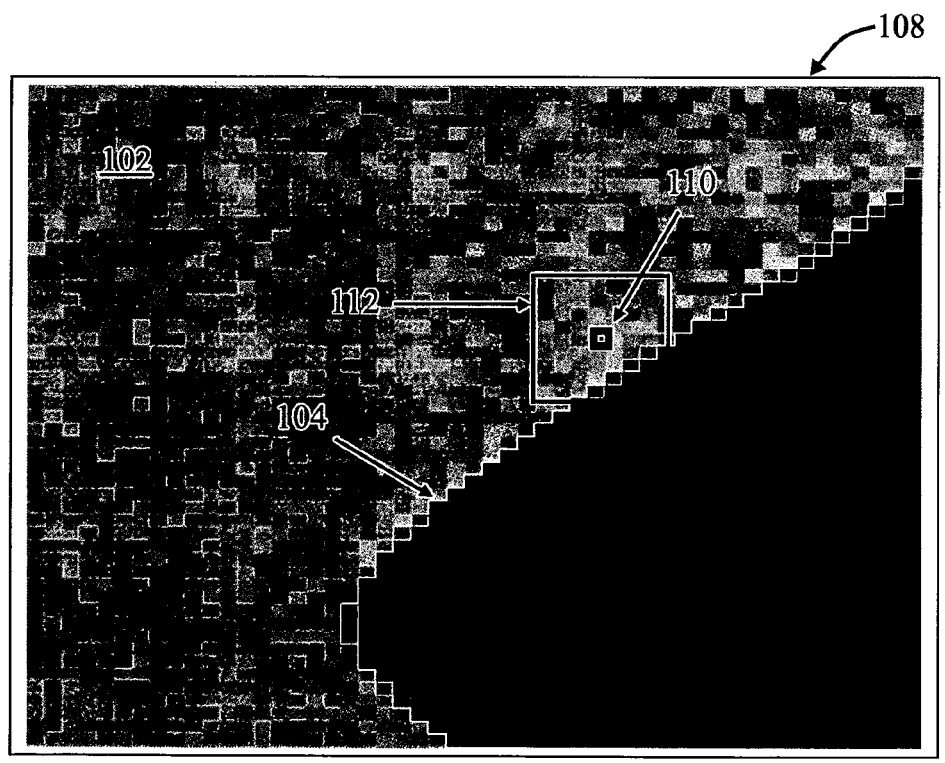

Image 100 includes a light region 102, and a dark region 104, with a fairly sharp boundary between them. In FIG. 3B, image 108 is image 100 with noise added to it. In the prior art, noise is sometimes reduced by averaging the grey values of pixels with the grey values of neighboring pixels, giving the most weight to pixels that are located closest. This works well in uniform areas without fine details, such as regions 102 and 104 in image 108, but could result in a blurring of the boundary between them. Another prior art noise reduction method, the bilateral filter, which is a nonlinear filter, tries to avoid this problem by averaging the grey value $I_i$ of a pixel i with the grey values $I_j$ primarily of other pixels j that resemble it in grey value. For example, when operating on a certain pixel i located at $(x_i, y_i)$, the weight $W_j$ given for the grey value of another voxel j, located at $(x_j, y_j)$, is given by:

$$W_j = \exp\left(-\frac{(x_i - x_j)^2}{\sigma_P} - \frac{(y_i - y_j)^2}{\sigma_P} - \frac{(I_i - I_j)^2}{\sigma_R}\right)$$

$$= \exp\left(-\frac{d_P^2}{\sigma_P} - \frac{(I_i - I_j)^2}{\sigma_R}\right)$$

Here $d_P$ is the Euclidean distance between the two pixels in space, and $|I_i - I_j|$ may be considered an abstract "distance" between the two pixels, a measure of how much they resemble each other. The new grey value for pixel i is defined to be $$\tilde{I}_i = \frac{\sum_{j \in N} W_j \cdot I_j}{\sum_{j \in N} W_j}$$

where N is the search window around pixel i, and the summation is for all pixels j in that search window.

Another type of nonlinear filter used for noise reduction is described by L. Rudin, S. Osher, and E. Fatemi, "*Nonlinear total variation based noise removal algorithms,*" Physica D60, 259-268 (1992).

In the non-local means filter, the resemblance of two pixels depends on pixel-by-pixel comparison of neighborhoods of the two pixels. For example, to reduce the noise level of pixel i, labeled 110 in FIG. 3B, a neighborhood $M_i$, labeled 112 in FIG. 3B, is defined around pixel 110. Other pixels j are then searched, with a neighborhood $M_j$ of the same size and shape around each such search pixel j, and a mean square error $MSE(M_i, M_j)$ is found between the pixels of neighborhood 112, and the corresponding pixels of the neighborhood of each search pixel j. Search pixels for which the mean square error is small between their neighborhoods and the neighborhood of pixel 110 are given the most weight, when averaging the grey values of the search pixels to obtain a reduced noise grey level for pixel 110. The weight $W_j$ is given by $$W_j = \exp\left(-\frac{d_P^2}{\sigma_P} - \frac{MSE(M_i, M_j)^2}{\sigma_R}\right)$$

The new value for pixel i is then determined as before:

$$\tilde{I}_i = \frac{\sum_{j \in N} W_j \cdot I_j}{\sum_{j \in N} W_j}.$$

Figure 4A:
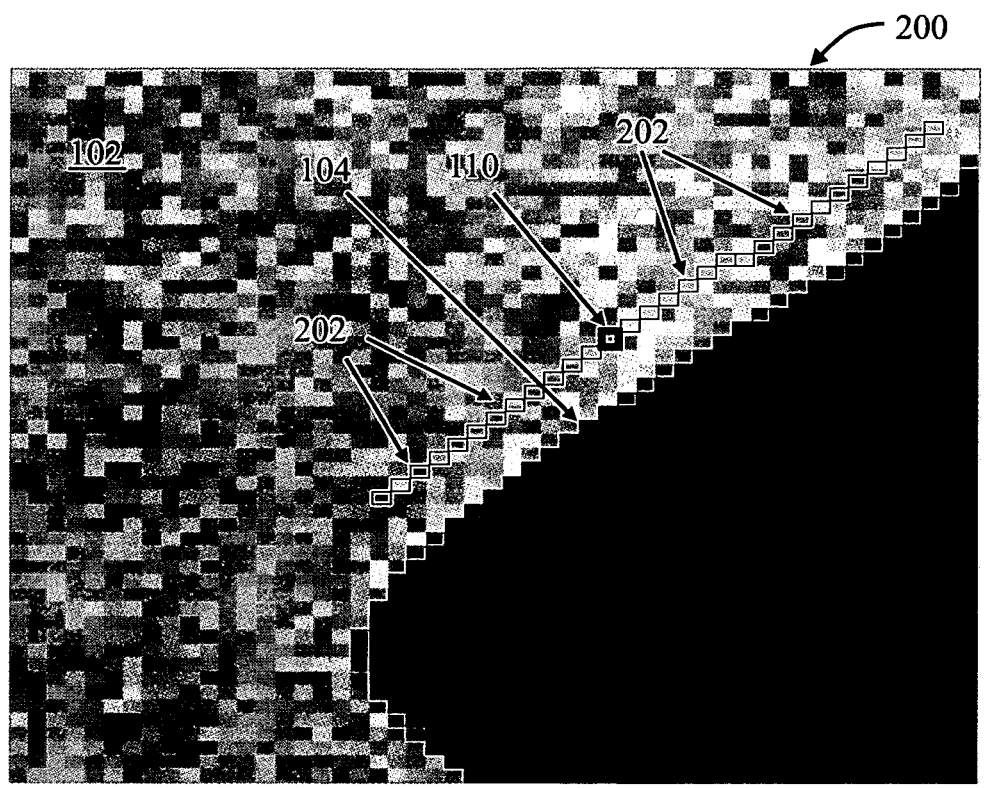
FIG. 4A schematically shows the image and selected pixel and neighborhood of FIG. 3B, together with other pixels that are similar to the selected pixel according to an algorithm for reducing noise in an image which may be used in the method of FIG. 1A.

FIG. 4A shows an image 200, like image 108 in FIG. 3B, with a set of pixels 202 that have neighborhoods that resemble neighborhood 112 or pixel 110. Each of pixels 202 has a similar neighborhood because pixels 202 are all about the same distance from an edge between light region 102 and dark region 104 oriented in nearly the same direction.

In other noise reduction methods that use nonlinear filters, the resemblance of two neighborhoods is based on the mean grey value of all pixels in the neighborhood, or on the direction of the gradient of the grey value of the pixels in the neighborhood, as described by M. Mahmoudi, and G. Sapiro, "*Fast image and video denoising via nonlocal means of similar neighborhoods,*" IEEE, Signal Proc., vol. 12, no. 12, pp. 839-842, December 2005. In a different method, described by A. Heidarzadeh and A. N. Avanaki, "*An Enhanced Nonlocal*

Means Algorithm for Image Denoising," 9th ISSPA, February 2007, the resemblance of the two neighborhoods depends on the mean square error of binary edge maps of the two neighborhoods, as determined using a Canny edge detector, as well as on the mean square error of the original image in the two neighborhoods.

Figure 4B:
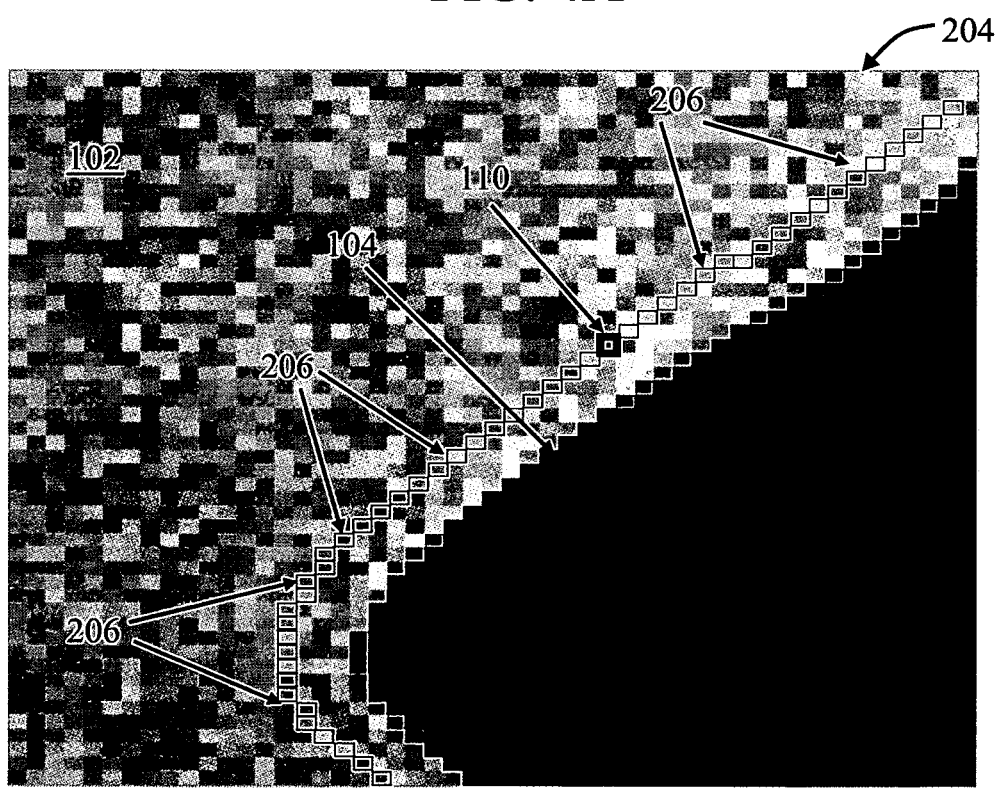
FIG. 4B schematically shows the image and selected pixel and neighborhood of FIG. 3B, together with other pixels that are similar to the selected pixel according to another algorithm for reducing noise in an image which may be used in the method of FIG. 1A.

FIG. 4B shows an image 204, like image 108. Calculating the weights $W_j$ using different criteria for the resemblance between two neighborhoods, according to an exemplary embodiment of the invention, a better set of search pixels 206 is found, which have neighborhoods that resemble neighborhood 112 of pixel 110 sufficiently closely. In the particular example shown in FIG. 2B, the criteria, which will be explained in detail below, do not depend on the relative orientation of the neighborhoods, so all pixels that are about the same distance from dark region 104 as pixel 110 will have neighborhoods that closely resemble neighborhood 112, according to these criteria. This enlarged set of search pixels 206 with high weights, compared to search pixels 202 with high weights using the non-local means method, may allow a further reduction in noise, because there are more pixels to average grey value over. In some embodiments of the invention, the criteria for resemblance between two neighborhoods may depend on relative orientation of the two neighborhoods, and in these or other embodiments of the invention, the number of search pixels with high weights may not be greater than in prior art methods, but the quality of the search pixels may be better, in the sense that they provide a better estimate of the true grey value of pixel 110.

Figure 5:
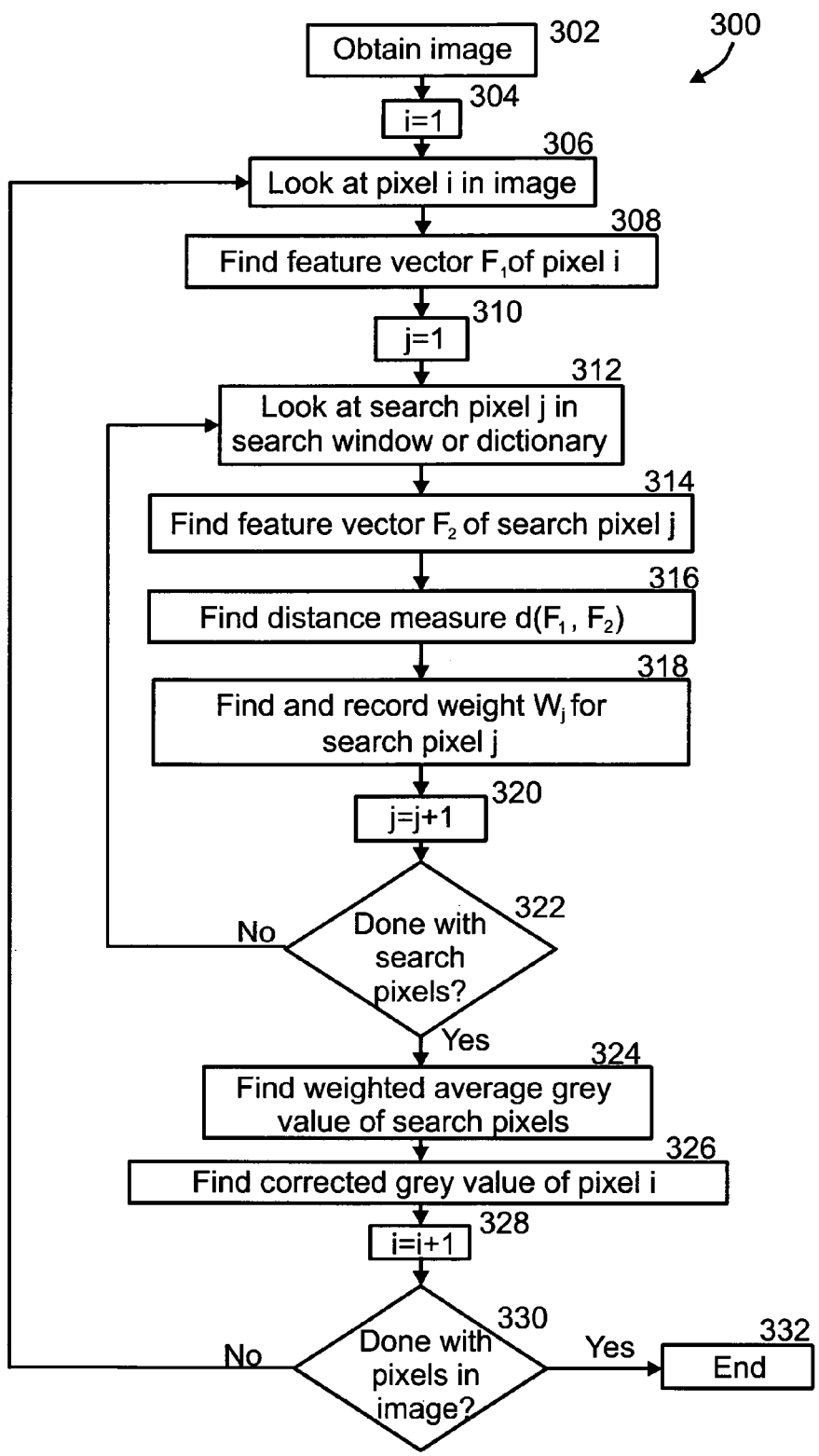
FIG. 5 is a flowchart for a method of reducing noise in an image, which may be used in the method of FIG. 1A.

FIG. 5 shows a flowchart 300 for a method of reducing noise in an image, according to an exemplary embodiment of the invention. The method of flowchart 300 is a generalization of the method of FIG. 4B, with different criteria for resemblance between neighborhoods. At 302, an image with noise is obtained. The noise reduction algorithm examines one pixel at a time, and initially sets a pixel index i equal to 1, at 304. At 306, the i-th pixel is considered, and a feature vector $F_1$ is found at 308. A feature vector is an ordered set of values of one or more features, each depending on the grey value of the pixel being considered, and/or the grey values of other pixels in an associated neighborhood. The neighborhood need not be contiguous, and need not surround the pixel, but could be on one side. The coordinates of the pixel being considered, for example $x_i$ and or $x_i$, $y_i$ and $z_i$ in the case of a three-dimensional image, may also be treated as features. Examples of features known in the prior art include the grey value of pixel i, used in the bilateral filter described above, and the grey values of each of the pixels in a neighborhood of specified size around pixel i, used in the non-local means filter. Other features known in the prior art, as described above, include the mean grey value of all the pixels in a neighborhood of pixel i, the direction of the gradient of grey values in a neighborhood of pixel i, and the grey value of each pixel in a binary edge map of a neighborhood of pixel i, as determined using a Canny edge detector. There are a wide variety of other features that may be used, as described for example in the published PCT application WO2009/081410 that this application claims priority from, on pages 14-17.

Starting at 310, a set of search pixels is examined, labeled by search pixel index j, in order to find pixels that resemble pixel i in having similar feature values. The grey values of the search pixels j which most resemble pixel i will contribute the most to an estimate of true grey value, without noise, of pixel i. Initially, at 310, index j is set equal to 1. At 312, the j-th search pixel is considered. The search pixels optionally comprise all pixels in the image, or all pixels except pixel i. Alternatively, the search pixels comprise only a subset of pixels in the image, for example only pixels within a search window around pixel i, or only some pixels selected randomly or at regular intervals within the search window, and/or only pixels with a grey value sufficiently close to that of pixel i. Optionally, for example in a medical image, the image is segmented into different types of tissue using any known segmentation technique, and search pixels are chosen only, or preferentially, from pixels of the same type of tissue as pixel i.

In some embodiments of the invention, instead of or in addition to using search pixels chosen from the image being denoised, search pixels may be chosen from other images in a database. For example, a dictionary may be compiled in advance, of possible search pixels and their neighborhoods, from other images that are expected to be similar to this image. For example, if the image is a medical image, the dictionary comprises possible search pixels and their neighborhoods, taken from earlier images made of the same part of the body of the same patient, or from the same part of the body of other patients.

At 314, a feature vector $F_2$ is evaluated for search pixel j. Feature vector $F_2$ is an ordered set of one or more values of features, each corresponding to one of the feature values in feature vector $F_1$. Optionally, corresponding features in $F_1$ and $F_2$ are defined in the same way, using the grey values of corresponding pixels in neighborhoods of pixel i and pixel j. In some embodiments of the invention, the values of corresponding features in $F_1$ and $F_2$ are defined differently, for example the neighborhood around one of the pixels may be oriented at a different angle, or scaled in size, relative to the neighborhood around the other pixel, with the grey values interpolated if necessary, in calculating the feature value. In any case, corresponding feature values in $F_1$ and $F_2$ are optionally defined in a similar enough way that it is meaningful to compare them, and to use the differences in their values to calculate an abstract distance measure between pixel i and pixel j, that measures how much they resemble each other for purposes of noise reduction.

If search pixel j is taken from a previously stored dictionary of search pixels, rather than from the image being examined, then optionally feature vector $F_2$ for pixel j, or some of its components, is also stored in the dictionary, and does not have to be calculated each time it is used. Similarly, if search pixel j was previously used as a search pixel for another pixel i, then its feature vector $F_2$ is optionally stored in memory, and does not have to be calculated again. Optionally, feature vector $F_2$ is evaluated in advance, optionally for all pixels in the image, and is stored in memory, so $F_2$ does not have to be evaluated during loops over search pixel j and pixel i. To the extent that feature values of $F_2$ are defined in the same way as corresponding feature values of $F_1$, feature vector $F_2$, or some of its components, may also be retrieved from memory, rather than calculated again, if search pixel j was previously used as the pixel i being examined at 306.

At 316, a distance measure $d(F_1, F_2)$ is optionally calculated, which is an abstract distance reflecting the resemblance of pixel j to pixel i, as defined by their grey values and the grey values of their neighborhoods, and possibly by their locations as well.

Distance measure d depends on the differences in value of each of the corresponding features making up feature vectors $F_1$ and $F_2$. If feature vectors $F_1$ and $F_2$ each have k components (feature values) given by $F_1=(f_1^1, f_2^1, \ldots, f_k^1)$ and $F_2=(f_1^2, f_2^2, \ldots, f_k^2)$, then the distance measure may be defined by $$d(F_1,F_2)=(\alpha_1|f_1^1-f_1^2|^\beta+\alpha_2|f_2^1-f_2^2|^\beta+\ldots+\alpha_k|f_k^1-f_k^2|^\beta)^{1/\beta}$$

Here $(\alpha_1, \alpha_2, \ldots, \alpha_k)$ is a weight vector giving weights used for the different features in calculating the distance measure. The parameter $\beta$ is typically a positive number of order unity, and is often set equal to 2, which makes $d(F_1, F_2)$ a Euclidean distance of orthogonal components which are each equal to a weighted absolute difference between feature values for the two pixels i and j. The weight vector $(\alpha_1, \alpha_2, \ldots, \alpha_k)$ is optionally found using a genetic algorithm, which attempts to find an optimal weight vector that maximizes the effectiveness of the noise reduction method.

An alternative expression for $d(F_1, F_2)$, which takes into account correlations between different feature values, for example between the grey values of different pixels in a neighborhood, is described in published PCT application WO2009/081410, in the description of FIG. 8 of that application. That expression for $d(F_1, F_2)$ may include cross-terms such as $(f_1^1 - f_1^2)(f_2^1 - f_2^2)$, and may provide a more useful measure for the degree of resemblance between different neighborhoods, in a case where different feature values are correlated.

At 318, a weight $W_j$ for pixel j is optionally calculated from $d(F_1, F_2)$, and saved in memory. Weight $W_j$ is greatest when the neighborhoods of pixels i and j most resemble each other, i.e. when d is small, and $W_j$ is small when d is large. For example, $W_j = \exp(-d^2/\sigma_N)$. If the feature values depend only on the grey values of the pixel and its neighbors, and not on the position of the pixel, then optionally $W_j$ is defined by $W_j = \exp(-d^2/\sigma_N - d_p^2/\sigma_p)$, where $d_p$ is a measure of physical distance between pixels i and j, for example the Euclidean distance. Here $\sigma_N$ and $\sigma_p$ are parameters which determine how quickly $W_j$ falls off with increasing abstract distance d, and spatial distance $d_p$, between pixels i and j. Alternatively, $W_j$ has a different dependence on d and $d_p$, but still falls off at greater values of d and $d_p$. Optionally, to save computation time, or to enhance performance, the weight $W_j$ is set equal to zero when it is smaller than some threshold, or when d and/or $d_p$ is larger than some threshold.

At 320, search pixel index j is increased by 1, to look at the next search pixel. At 322, it is determined whether all the search pixels have been examined. If not, the next search pixel is considered at 312. When all the search pixels have been examined, a weighted average of the grey values of the search pixels j, weighted by $W_j$, is calculated.

At 326, a true grey value for pixel i without noise is estimated, based on the grey values of the search pixels, and optionally on the original grey value of pixel i as well, with search pixels having a greater influence on the estimated true grey value if they are deemed to be more similar to pixel i, based on having similar feature values. For example, the similarity in the feature values is used to calculate an abstract distance measure $d(F_1, F_2)$, as described above, each search pixel j is assigned a weight $W_j$ based on its distance measure from pixel i, and the estimated true grey value of pixel i is found from a weighted average of the grey values of the search pixels j, with weights $W_j$. The average can be a mean, a median, a mode, a mean with outliers removed, or any other type of average.

Alternatively, an estimate of a true grey value of pixel i is calculated in a different way from the grey values of the search pixels, and the feature vector $F_2$ of the search pixels and feature vector $F_1$ of pixel i. For example, search pixels are divided into classes, optionally representing different tissue types, based on clustering of their feature vectors $F_2$, and only search pixels in the same class as pixel i are used to estimate the true grey value of pixel i, or have a greater effect on the estimated true grey value of pixel i. Alternatively, only the top few search pixels j that have feature vector $F_2$ closest to $F_1$ by some measure, are used to estimate the true grey value of pixel i. Optionally, instead of using an average of grey values of search pixels that contribute, the estimated true grey value of pixel i is found from a look-up table based on the grey values of a few search pixels.

The corrected grey value is optionally a linear combination of the original grey value of pixel i, and the weighted average of the search pixels. Optionally the original grey value of pixel i is not taken into account explicitly, but optionally pixel i itself is treated like another search pixel and is included in the weighted average. In this case, the weight $W_j$ for pixel i itself would be 1 if the feature values of $F_2$ are defined in the same way as the corresponding feature values of $F_1$, but might be less than 1 if the feature values of $F_2$ are defined differently, for example with the neighborhood rotated or scaled.

It should be understood that the grey values of the pixels referred to herein are not necessarily the original grey values of the image, but could be grey values of a transformed or filtered image, for example a Gaussian filtered image with $\sigma$ equal to only a few pixel widths or less.

At 328, pixel index i is increased by 1, and at 330, it is determined if there are any pixels remaining to consider. If there are, the next pixel i is considered at 306. If not, the procedure ends at 332, with the reduced noise image, using the corrected grey values found at 326, as output.

Figure 6A:
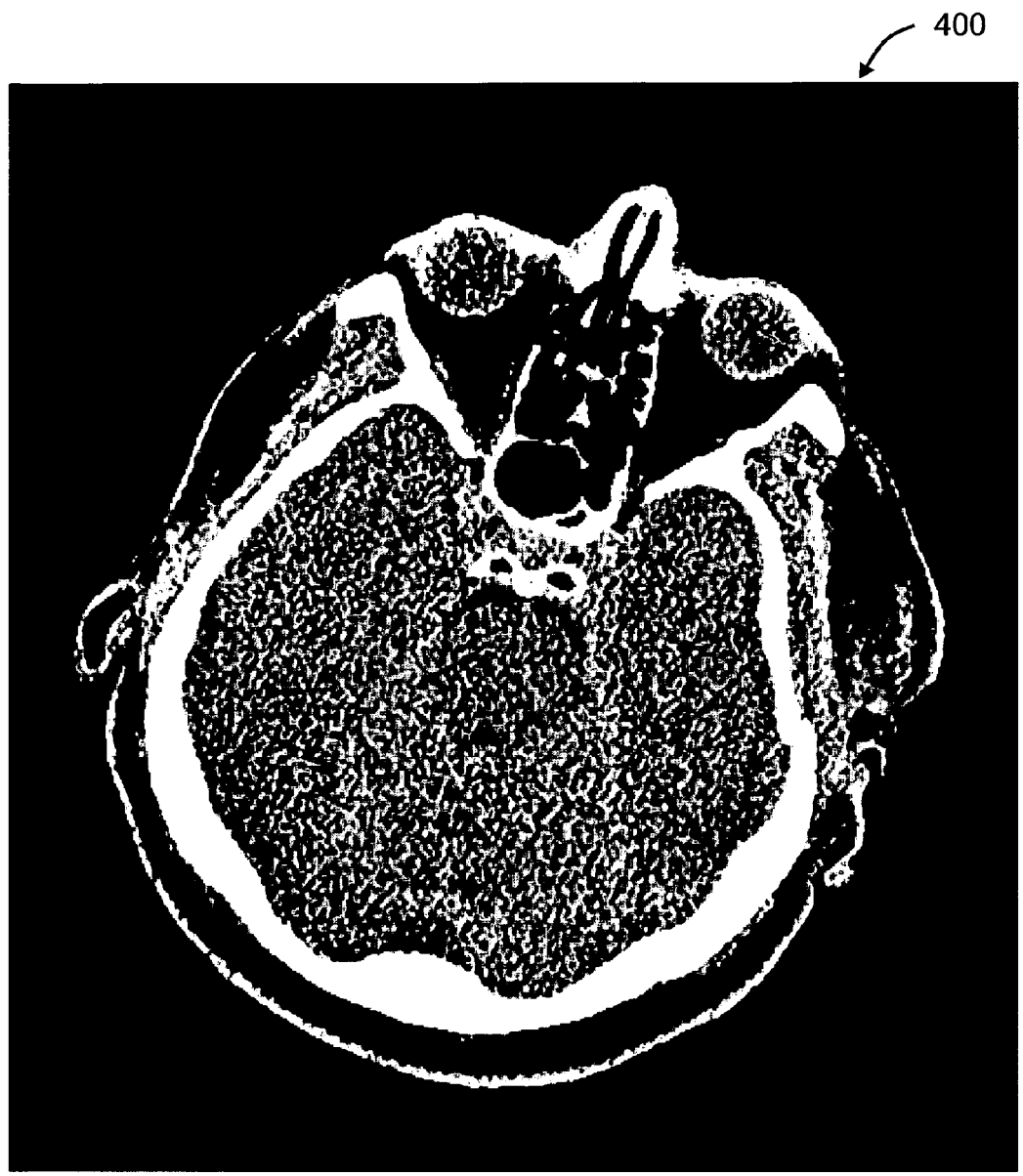
FIG. 6A is a noisy CT image made using a relatively low x-ray dose.
Figure 6B:
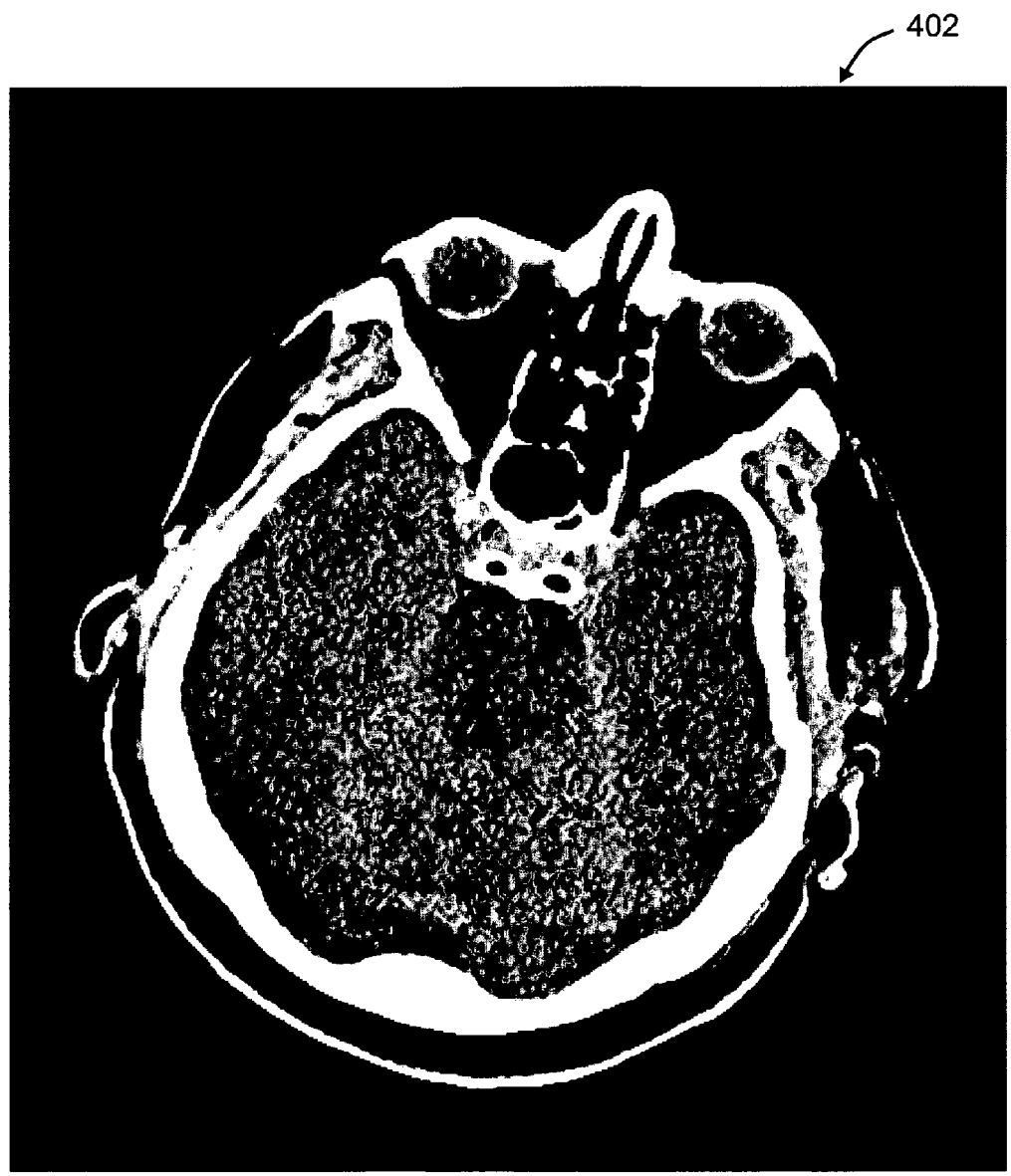
FIG. 6B shows the image of FIG. 6A, with noise reduced using the method of FIG. 5.
Figure 6C:
FIG. 6C is a low noise CT image similar to the image in FIG. 6A, but made using a relatively high x-ray dose.

FIG. 6A shows a noisy image 400, a CT image of a slice of the head, to illustrate the method outlined in FIG. 5. The image is noisier than normal, because it was obtained using a reduced x-ray dose. FIG. 6B shows a reduced noise image 402, obtained from image 400 using the method of FIG. 5 with a set of features and a weight vector that will be described below. For comparison, FIG. 6C shows a low noise image 404, obtained using a normal x-ray dose for this kind of image. Noise reduced image 402 has considerable less noise than original image 400, and more detail can be seen, particularly in the brain where there is relatively low contrast between different tissues. Image 402 appears to be closer in quality to low noise image 404, than to image 400.

Restoration of Details from Residual Image

D is the denoised version of original image I. The denoised image tends to be smoother, but small structures and organs are sometimes also smoothed away. After the denoising algorithm is applied, a restoration procedure is optionally used to recover and enhance structures which were partially removed or smoothed away by the denoising algorithm.

The residual image R depends on differences between the original image and the denoised image, and is, for example, R=I-D. The residual image is mostly noise, the additive noise which was removed from the original image, but nevertheless structures with spatial consistency may often be restored from the residual image using nonlinear edge-preserving filters.

In an exemplary embodiment of the invention, the denoising algorithm averages similar regions together, so the residual image is mostly noise when examined at fine scales. Still, the residual image may hold some hidden information, which looks like noise when examined at a fine scale, but exhibits spatial consistency when examined at somewhat larger scales. In order to reveal such hidden structures, nonlinear edge-preserving filters are optionally used, which try to locate edges in the form of 2D surfaces in the 3D residual image, or 1D edges in the case of a 2D image, and smooth the residual image in parallel to these edges. Exemplary suitable filters include the nonlinear anisotropic diffusion filters, such as Beltrami flow filters and coherence-enhancement diffusion (CED) filters. The filtered residual image, called S, can reveal spatial-consistent structures while smoothing away the residual noise. In some embodiments of the invention, edges or other structures are enhanced in S, but noise is not smoothed away. Alternatively, the residual image is not filtered, and the residual image R is used instead of a filtered residual image S, in the procedure described below. Whichever method is used, a restored denoised image is obtained which optionally is more sensitive to the grey value of residual image R, or filtered residual image S, at positions where the residual image has a greater degree of structure, than it is at positions where the residual image has a smaller degree of structure.

The filtered residual image S is optionally added back to the denoised image D, to obtain a restored denoised image D' with the smoothed details put back. Optionally, the image is over-enhanced by adding D to α·S, with a greater than 1. Optionally, an adaptive α parameter is used, which is dependent on a local "structureness" of S. There are many measurements which can be used to estimate if a certain region contains a consistent structure or coherence. For example, eigenvalues of a structure tensor or eigenvalues of the Hessian matrix of S are optionally used, in order to determine a at each location. Optionally, information in the residual image R is restored to the denoised image D only in regions where structures are found in the residual image, so little noise is brought back to the denoised image.

In practice, radiologists often prefer a small amount of noise to be left in the image, so it will look more "realistic" to them. Optionally, to achieve this, a is kept greater than 0 even in regions where there appears to be only noise in the residual image.

Using D'=D+α·S can add misleading structure to the image in relatively smooth regions. Optionally, the range of density of S is bounded. An alternative method regards α as an "envelope", which restricts the amount that S can change the density of the image at each location. With this method, a truncated or compressed version of S is added to D, $$D'=D+\alpha \cdot \text{truncate}(S/\alpha)$$

or $$D'=D+\text{truncate}(\alpha) \cdot S$$

where the truncate function is, for example, the hyperbolic tangent (tan h) function, or a function such as the range compression function y(x) given above, or a function that is linear up to a threshold value, and constant above that value. The local value of a determines the allowed range of densities that S can add or remove from the denoised image D at a given voxel.

Optionally a sharpening filter is applied to D or to D'. This filter, when applied, is optionally restricted by a similar envelope, based for example on the local standard deviation of the image. Optionally, the sharpening filter is only applied, or is applied more strongly, in regions with a lower standard deviation. Without the envelope, the sharpening filter may induce visual artifacts, especially near sharp edges such as the edge of the skull. Using the envelope, the additional sharpness cannot exceed a relative threshold, and visual artifacts are possibly reduced or avoided completely. In some embodiments of the invention, the filter is only applied, or is applied more strongly, in regions with intermediate standard deviation, and not in regions of high standard deviation, where the filter may induce visual artifacts, and in regions of low standard deviation, where the filter may only be amplifying noise.

A novel variation of the CED scheme takes structural information from the denoised image D, while applying the filter to the residual image R. The restoration procedure is optionally divided into three steps. First, a structure tensor of the image is calculated, followed by a calculation of a diffusion tensor for each pixel, based on the eigendecomposition of the structure tensor, followed by a diffusion step. Optionally, an iterative procedure is used, with the structure tensor for a given iteration calculated from $(1-\lambda) \cdot D + \lambda \cdot S$, where S is the filtered residual image following the previous iteration, and the coefficient λ gradually becomes closer to 1 as the iterations continue.

Adding Noise to Denoised Image

Denoised images sometimes look unnatural to radiologists, who may be used to examining CT images with a certain amount of noise, even when the images are taken under good imaging conditions. In order to produce images which look more natural, a weighted average image of D' and I may be used. For example, an image $E=\beta D'+(1-\beta) I$ is found, where β is a spatially varying weighting parameter, which is chosen such that the resultant image E contains noise which is distributed similarly to the noise in the input image I, but lower in magnitude. It should be understood that if the restoration procedure is not used, then D may be used here instead of D'.

In some implementations, the weighting parameter β is calculated as follows. First, local standard deviation maps are calculated for D' and I. The standard deviation maps are denoted as $STD_{D'}$ and $STD_I$, respectively. Then, a preliminary value is calculated for β according to the following formula:

$$\beta = \frac{(STD_I - \sigma_N)}{\max(STD_I - STD_{D'}, \varepsilon)}$$

Here $\sigma_N$ is a parameter which controls the amount of added noise, for example $\sigma_n=4$, and ε is a small positive constant, for example $\varepsilon=10^{-3}$. Next, β is optionally range-compressed, for example using the range compression function y(x) defined above, for example with a=0 and b=1. Finally, β is optionally smoothed, for example by filtering with a Gaussian filter.

Resolution Reduction

Radiologists usually examine CT images in lower resolution than the resolution of the original images obtained by a CT machine. Typically, the slice thickness of the examined image is about four times the slice thickness of the raw image reconstructed by the CT machine.

Optionally, the original image I, that the denoising algorithm and related procedure described above are applied to, is the high resolution raw image obtained from the CT machine. In order to obtain an image at the lower resolution generally used for the CT images examined by radiologists, a final resolution reduction procedure optionally takes place. In the prior art, such a resolution reduction procedure is typically carried out by first filtering the image with a low-pass filter, for example an anti-aliasing filter, and then sub-sampling to the desired resolution.

In an exemplary embodiment of the invention, a non-linear resolution reduction procedure is used, which is designed to preserve more detail than prior art resolution reduction procedures. For example, a generalization of the method described by E. H. Adelson, C. H. Anderson, J. R. Bergen, P. J. Burt and J. M. Ogden, in the paper cited above, may be used.

Originally, the method of Adelson et al was developed for the fusion of two images taken at different camera focus settings into a single image, containing the important data features from both images. A similar method may be used for fusing multiple CT slices, and optionally may be applied in a separable manner along other image dimensions a well, to obtain the examined image resolution. In what follows, such a non-linear down-sampling procedure is described. Optionally, when applied to a three-dimensional image that comprises slices arranged in a slice direction, the procedure results in an image that has reduced resolution in the slice direction, but the resolution is not reduced in directions along each slice, for example in the plane of a planar slice, perpendicular to the slice direction.

First, a band-pass decomposition is performed on each slice of the high resolution raw CT image. For example, the slice is transformed into a Laplacian pyramid. Laplacian pyramids are described, for example, by P. J. Burt and E. H. Adelson, cited above. Then, for each set of n, consecutive slices, for example each set of 4 slices, a single pyramid structure, corresponding to a single thicker slice, is optionally created in the following manner. For at least some levels of the pyramid, a nonlinear procedure is used to combine the n, slices to form that level of the pyramid for the thicker slice, although this need not be done for all levels of the pyramid. For example, for the top level of the pyramid (containing the low frequency content of the images), the thicker slice is optionally created by averaging all the top level images of the n, Laplacian pyramids, a linear procedure. But for the other levels of the pyramid, a nonlinear procedure is used to form the thicker slice, which gives more weight, at least in some cases, to the thinner slice for which the image locally has greater amplitude. For example, the other levels of the pyramid for the thicker slice are formed by taking at each location the respective value from one of the n, pyramids. The selected value is optionally the one with the highest absolute value amongst all $n_s$ pyramids, unless this value is higher than a certain threshold, for example 10 HU, in which case the average across all $n_s$ pyramids is taken. Finally, the thicker CT slice is formed by reconstructing the formed pyramid structure. All of the thicker slices together form the lower resolution image, with the nonlinear procedure tending to preserve fine detail in directions along each slice, perpendicular to the slice direction.

In some embodiments of the invention, instead of or in addition to using a Laplacian pyramid as the band-pass decomposition, another type of band-pass decomposition is used. For example a wavelet transform is used, as described in the paper by Li Hui, B. S. Manjunath, and S. K. Mitra, cited above. Additionally or alternatively, any of the methods of fusing images described by Moustafa and Rehan, cited above, may be used.

Optionally, the low resolution image created by this nonlinear scheme is combined as a weighted average with a linearly sub-sampled low resolution image.

Exemplary Types of Features Used in NLM Denoising Algorithm

Several types of features may be used in the feature vectors $F_1$ and $F_2$.

In some exemplary embodiments of the invention, calculating one or more of the feature values comprises finding characteristics of a distribution of grey values of pixels in a neighborhood. Optionally, the feature value is a moment of the distribution of grey values, or a function of one or more moments, where the first moment of a distribution is the mean, the second moment in the standard deviation, the third moment is the skew, and so on. The k-th moment of the distribution, for k>1, may be defined as $$M_k = \left( \frac{1}{N} \sum_n (I_n - M_1)^k \right)^{1/k}$$

where $I_n$ is grey value of the n-th pixel in the neighborhood, the sum is over the N pixels in the neighborhood, and $M_1$ is the first moment, i.e. the mean of the grey values. Alternatively or additionally, the feature value is, or depends on, an order statistic of the distribution, the grey value corresponding to a given percentile of the distribution. For example, the feature value is the median grey value, which is the grey value at the 50% percentile. Alternatively, the grey value of a different percentile is used, for example the 25%, 37.5%, 62.5% or 75% percentiles. Optionally, an intermediate percentile is used, for example between 25% and 75%, which has the potential advantage that the feature value will be a characteristic of the neighborhood as a whole, and not just of a few outlier pixels in the neighborhood. Optionally, if search pixels are chosen from a dictionary which includes search pixels of other images, with grey values normalized differently, then the grey values of the two images are normalized so they may be meaningfully compared, for example in features based on order statistics.

A feature that depends only on characteristics of the distribution of grey values of pixels in a neighborhood, particularly if the neighborhood is a square or another shape that is fairly isotropic, has the potential advantage that the feature value may be relatively insensitive to the orientation of structures in the image. Using such a feature for image 204 in FIG. 4B, for example, is likely to produce a set of pixels like pixels 206 which have feature value close to that of pixel 110, because the feature value will depend mostly on the distance of the pixel from dark region 104, and not on the local orientation of the boundary between the dark and light regions. On the other hand, if it is known that a certain part of the image has edges or texture oriented in a particular direction, for example from a segmentation map of body tissues, then it may be advantageous to use features that are sensitive to orientation of structures.

Optionally, the feature value is not found from a distribution of the raw grey values of the pixels in the neighborhood, but from a distribution of the grey values after the image has been smoothed and/or otherwise processed in some way. Smoothing the image before evaluating such feature values has the potential advantage that the feature value may depend more on structural characteristics of the image in the neighborhood, and be less sensitive to noise in the neighborhood. Optionally, such smoothing or image processing is done before evaluating the feature value for any of the types of features described herein, not just for features that depend on a distribution of grey values. The smoothing may be done, for example, by a Gaussian filter, a bilateral filter, or a total variation filter as described by Rudin et al, cited above. Optionally, the smoothing is done in a way that does not smooth out most of the structure on a scale of the largest dimension of the neighborhood that is being used for the feature, or even on a scale of the smallest dimension of the neighborhood. For example, if a Gaussian filter is used with width parameter a, then a is optionally smaller, or at least not much larger, than the largest dimension of the neighborhood, or the smallest dimension of the neighborhood. Alternatively, the smoothing is done in a way which effectively smoothes out all the spatial structure of the neighborhood, and the feature value is a measure of structure not within the neighborhood, but of structure on a larger scale around the neighborhood, or of an average gradient around the neighborhood.

Optionally, the image is processed in a different way before finding the distribution of grey values. For example, a derivative operator is applied to the image, replacing the grey value of each pixel by a value proportional to the derivative of the image in a particular direction, or by a value proportional to the magnitude of the gradient of the image. If this is done, then, for example, the mean of the distribution of values of the pixels in the neighborhood will be a measure of the average gradient in the neighborhood. Optionally, the image is smoothed before finding the gradient, optionally sufficiently smoothed so that most of the pixels in the neighborhood have nearly the same gradient, making this feature value less sensitive to noise.

In some exemplary embodiments of the invention, calculating the feature value comprises applying to the image, at least within a neighborhood, a transform or filter that preferentially selects structures of a range of scales intermediate in size between the largest dimension of the neighborhood, and a few pixels. Alternatively or additionally, the transform or filter preferentially selects structures oriented in some directions over other directions. Features defined in this way may be useful for picking out structures in the image that are expected to have dimensions and/or orientations within a certain range, for example blood vessels, while ignoring finer scale variations in density that are due to noise.

These embodiments of the invention may use features that employ any of a large variety of filters and transforms, linear and nonlinear, which have been used for applications such as computer handwriting recognition, or automatically classifying objects in images so they can be searched without relying on text description.

Such features may depend on the response of the image in the neighborhood to wavelet filters, such as Meyer or Gabor filters, Laplacian and Gaussian pyramids, or differences of Gaussians, or any other linear filters known in the art. Such filters may be most sensitive to structures in the neighborhood that have particular orientations, and/or particular scales. Optionally, the filter is applied only to the neighborhood. Alternatively, the filter is applied to a region larger than the neighborhood, or even the whole image, and the feature depends on the response of the filter in the neighborhood, for example on the grey value of one or more pixels in the neighborhood, after the image has been filtered. These options and alternatives apply also to any of the other types of features described herein that involve applying a filter or a transform to image pixels.

Additionally or alternatively, the feature value depends on a difference in the response of the image to Gaussian filters, or other smoothing filters, at two different size parameters $\sigma_1$ and $\sigma_2$. The difference between two such filters tends to select structures intermediate in scale between $\sigma_1$ and $\sigma_2$, but without any dependence on orientation of the structures, if the filters are isotropic. A feature defined in this way may be particularly useful if the image has similar structures oriented in many different directions. For other images, which are known to have structures that tend to be oriented in a particular direction or narrow range of directions, other feature measures, that do depend on orientation of the structures, may be advantageous to use.

In some embodiments of the invention, the feature may depend on the response of the image in the neighborhood to a nonlinear transform, such as a morphological multi-scale transform or a morphological operator. For example, the feature value depends on the grey value of the pixel being examined, or a particular pixel in the neighborhood, after applying a nonlinear multiscale transform to the image using a particular scale parameter. Optionally, the feature value depends on the grey value of the pixel using two or more different scale parameters, for example the difference in grey value of the pixel for two different scale parameters. Examples of morphological multiscale transforms include morphological wavelets and morphological pyramids, described for example by E. H. Adelson, C. H. Anderson, J. R. Bergen, P. J. Burt, and J. M. Ogden, "*Pyramid Methods in Image Processing*," RCA Engineer 29, no. 6, November-December 1984, pp. 33-41, or in "*Nonlinear Multiresolution Signal Decomposition Schemes—Part I: Morphological Pyramids*," John Goutsias, and Henk J. A. M. Heijmans, IEEE Transactions On Image Processing, vol. 9, No. 11, November 2000.

Additionally or alternatively, the feature may depend on the grey value of a pixel after applying a morphological operator. Morphological operators are applied to an image to enhance or extract certain structures. An example of a morphological operator is the top hat transform, the difference between an input image and its morphological opening by a structuring element. Such an operation will reveal bright details on a dark background, with the size of the structuring element controlling the size of the detected features. A similar operator can be defined which extracts dark structures over a white background.

The literature on shape-matching and image morphing includes a wide variety of techniques that can be used to characterize shapes in an image, and any of these methods may be used to define features of a neighborhood, before or after applying morphological transforms or operators as discussed above. Examples include the Earth Mover's Distance introduced by Rubner et al; the Kantorovich-Wasserstein metric used for image morphing, described for example by Haker et al; the shape signatures defined by Osada et al; and the metrics for shape matching defined by Belongie et al; all referenced above.

In some exemplary embodiments of the invention, corresponding feature values for a pixel i that is being examined, and a search pixel j, are calculated with the neighborhoods changed by a geometric transformation in going from one to the other. For example, the two neighborhoods are at different relative orientations, scales, or both. Additionally or alternatively, one of the neighborhoods may be mirror reflected relative to the other. For example, if the algorithm for finding the feature value for pixel i involves using the grey value of a pixel in the neighborhood that is a certain distance away in the +x direction from pixel i, then the feature value for pixel j is calculated using instead a pixel that is the same distance away in the +y direction (a 90 degree rotation) from pixel j, or the same distance away in the −x direction (a reflection), or twice as far away in the +x direction (a scale change), or twice as far away in the +y direction (a rotation plus a scale change), etc. Optionally, the grey values of the rotated and/or scaled neighborhood are interpolated before calculating the feature value, particularly if the rotation angle is not an integer multiple of 90 degrees (in the case of a Cartesian grid of pixels) or the scale factor is not an integer. Optionally, the pixels are arranged in a triangular or hexagonal grid, or a more complicated pattern.

Using a feature defined in this way may be particularly useful if the same feature is defined without rotation and/or scaling and/or reflection, and for a variety of different rotation angles and/or scaling factors, and the resulting features are all given the same weight. This may result in a distance measure that is independent of the orientation and/or scale of structures in the image, at least over some range of orientations and/or scales. This may be advantageous if the image includes similar structures with different orientations or scales, or which are mirror images of each other.

As used herein, "noise reduction" and "reducing noise" are synonymous with "denoising." These terms do not imply that noise is necessarily eliminated completely, only that it is reduced in magnitude.

Any of the numbers mentioned above may optionally be greater or less by 10%, by 20%, by 50%, or by a factor of 2, 3, 5, or 10, or by greater, smaller, or intermediate amounts. Any of the densities specified in Hounsfield units may be greater or smaller by 10, 20, 30, 50, 70, 100, 150, or 200 HU, or by a greater, smaller, or intermediate amount.

As used herein, "average" can refer to a mean, a median, a mode, a representative value, or a weighted average.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of producing a denoised medical image at a specified resolution, comprising:
    a) denoising an original medical image acquired at a resolution higher than the specified resolution; and
    b) reducing the resolution of the original medical image, after denoising, to the specified resolution, using a nonlinear resolution reduction procedure including the steps of:
        (i) decomposing the thinner slices into band-pass components;
        (ii) for at least some of the band-pass components, combining the thinner slice components into thicker slice components in a way that, at least sometimes, gives more weight to a thinner slice component for which the component has a higher amplitude; and
        (iii) re-assembling the thicker slice band-pass components for each thicker slice, to produce the image at the specified resolution
    wherein the original medical image is a three-dimensional image including thinner slices of an original thickness, and reducing the resolution includes fusing multiple thinner slices using the nonlinear resolution reduction procedure to obtain an image with thicker slices.

2. A method according to claim 1, wherein combining the thinner slice components into thicker slice components in a way that gives more weight to a thinner slice component for which the component has a higher amplitude, is done at least for band-pass components other than the component containing the lowest frequency content, when, for that band-pass component and among all of the thinner slices being combined into the same thicker slice, a thinner slice component with a greatest absolute value has an absolute value that is below a threshold value.

3. A method according to claim 1, wherein the original medical image is a three-dimensional image comprising slices arranged in a slice direction, and reducing the resolution comprises reducing the resolution in the slice direction, but not reducing the resolution in directions along each slice.

4. A method according to claim 1, wherein the nonlinear resolution reduction procedure comprises a band-pass decomposition procedure.

5. A method according to claim 1, wherein the band-pass decomposition procedure comprises a Laplacian pyramid procedure.

6. A method according to claim 1, wherein the band-pass decomposition procedure comprises a wavelet transform procedure.

7. A method according to claim 1, wherein denoising the original medical image comprises:
   a) for each pixel being examined in the image, selecting a set of search pixels;
   b) calculating a value of at least one feature of a neighborhood of each search pixel, and a value of corresponding features of a neighborhood of the pixel being examined;
   c) calculating a value of at least one other feature of the same or a different neighborhood of each search pixel, and a value of corresponding feature of the same or a different neighborhood of the pixel being examined; and
   d) calculating a reduced noise grey value for each pixel being examined, based on raw or transformed grey values of its search pixels, with greater sensitivity to those with one or more feature values similar to those of the pixel being examined.

8. A system for producing a denoised medical image at a specified resolution, comprising:
   a) a medical imaging device for acquiring raw data for a 3-D medical image, capable of achieving at least a higher resolution than the specified resolution;
   b) a controller programmed to reconstruct slices of the image from the raw data, at the higher resolution, to denoise the image, and to reduce the resolution of the denoised image to the specified resolution by fusing thinner slices to form thicker slices, using a nonlinear procedure that comprises:
      i) decomposing the thinner slices into band-pass components;
      ii) for at least some of the band-pass components, combining the thinner slice components into thicker slice components in a way that, at least sometimes, gives more weight to a thinner slice component for which the component has a higher amplitude; and
      iii) re-assembling the thicker slice band-pass components for each thicker slice, to produce the image at the specified resolution.

9. A method of restoring removed structures to a denoised medical image, comprising:
   a) denoising an original medical image to produce the denoised image;
   b) finding a residual image that depends on differences between the denoised and original images;
   c) applying a nonlocal smoothing filter to the residual image to obtain a filtered residual image which indicates a degree of structure as a function of position in the residual image; and
   d) restoring structure by changing a grey value of each voxel in the denoised image by an amount which depends on the degree of structure at a corresponding location in the residual image, and on a grey value at a corresponding location in the residual image or the filtered residual image.

10. A method according to claim 9, wherein restoring structure comprises adding to the denoised image the weighted or unweighted filtered residual image.

11. A method according to claim 9, also including finding a measure of the degree of structure as a function of position in the residual image, from the filtered residual image, wherein restoring structure comprises adding to the denoised image the residual image or the filtered residual image weighted by an adaptive parameter that depends locally on the measure of the degree of structure as a function of position.

12. A method according to claim 11, wherein finding the measure of the degree of structure as a function of position in the residual image, comprises finding one or more eigenvalues of a structure tensor, a Hessian matrix, or both.

13. A method according to claim 9, wherein denoising the original medical image comprises:
   a) for each pixel being examined in the image, selecting a set of search pixels;
   b) calculating a value of at least one feature of a neighborhood of each search pixel, and a value of corresponding features of a neighborhood of the pixel being examined;
   c) calculating a value of at least one other feature of the same or a different neighborhood of each search pixel, and a value of corresponding feature of the same or a different neighborhood of the pixel being examined; and
   d) calculating a reduced noise grey value for each pixel being examined, based on raw or transformed grey values of its search pixels, with greater sensitivity to those with one or more feature values similar to those of the pixel being examined.

14. A method according to claim 9, wherein the nonlocal smoothing filter comprises a nonlinear edge-preserving filter.

15. A method according to claim 14, wherein the nonlinear edge-preserving filter comprises a nonlinear anisotropic diffusion filter.

16. A method according to claim 15, wherein the nonlinear anisotropic diffusion filter comprises a Beltrami flow filter.

17. A method according to claim 15, wherein the nonlinear anisotropic diffusion filter comprises a coherence enhancement diffusion (CED) filter.

18. A method according to claim 9, wherein, for most positions, the change in grey value is more sensitive to the grey value of the residual image or the filtered residual image or both, at positions where the degree of structure is greater, than it is at positions where the degree of structure is smaller.

19. A system for producing a denoised medical image with removed structure restored to it, comprising:
   a) a medical imaging device for acquiring raw data for medical images;
   b) a controller programmed to reconstruct a medical image from the raw data, to denoise the image, to find a residual image that depends on differences between the denoised and original images, to apply a nonlocal smoothing filter to the residual image to obtain a filtered residual image which indicates a degree of structure as a function of position in the residual image, and to restore structure by changing a grey value of each voxel in the denoised image by an amount which depends on the degree of structure at a corresponding location in the residual image, and on a grey value at a corresponding location in the residual image or the filtered residual image.

20. A method of producing a denoised medical image with a specified magnitude and distribution of noise, comprising:
   a) removing noise from an original medical image to produce an initial denoised image; and
   b) adding a portion of the removed noise to the initial denoised image to produced a denoised image with about the specified magnitude and spatial distribution of noise,
   wherein adding a portion of the removed noise includes the steps of
      (i) choosing a spatially varying weighting parameter which will achieve the specified magnitude and distribution of noise; and
      (ii) finding a weighted sum of the original image and the initial denoised image, according to the weighting parameter.

21. A method according to claim 20, wherein choosing the spatially varying weighting parameter comprises calculating local standard deviations of the original image and the initial denoised image.

22. A method according to claim 20, wherein removing noise from the original medical image comprises restoring removed structures to the initial denoised image.

23. A method according to claim 20, wherein adding noise comprises adding the original image multiplied by a spatially varying parameter that depends on the specified magnitude and distribution of noise.

24. A system for producing a denoised medical image with a specified magnitude and distribution of noise, comprising:
   a) a medical imaging device for acquiring raw data for medical images;
   b) a controller programmed to reconstruct a medical image from the raw data, to denoise the image, and to add a portion of the removed noise to the initial denoised image to produced a denoised image with about the specified magnitude and spatial distribution of noise, wherein said controller is further programmed to add a portion of the removed noise by:
      (i) choosing a spatially varying weighting parameter which will achieve the specified magnitude and distribution of noise; and
      (ii) finding a weighted sum of the original image and the initial denoised image, according to the weighting parameter.

25. A method of denoising a medical image, comprising:
a) for each of a plurality of selected voxels in the image, estimating a noise level in a large neighborhood surrounding the voxel, by:
   i) for at least some voxels in the large neighborhood that fall within a chosen range of grey levels, finding a degree of variation in grey level in a small neighborhood around the voxel;
   ii) finding a subset of the voxels for which the degree of variation in grey level is below a chosen quantile among the voxels for which the degree of variation was found; and
   iii) setting the noise level equal to an average of the degrees of variation for the voxels in the subset;
b) finding noise level as function of position in the image, from the estimated noise levels for the selected voxels; and
c) denoising the image, using a denoising algorithm that makes use of the noise level as a function of position.

26. A method of denoising a medical image using a known noise level as a function of position in the image, comprising, for each voxel in the image:
   a) choosing a set of comparison voxels for said voxel;
   b) calculating a similarity measure between a neighborhood associated with said voxel and a neighborhood associated with each comparison voxel;
   c) finding a weighted average of the grey levels of the comparison voxels, the weight for each comparison voxel depending on the similarity measure for its neighborhood, normalized to a value that depends on the noise level at the position of said voxel, the noise level at the position of the comparison voxel, or both; and
   d) changing the grey level of said voxel according to the weighted average of the grey levels of the comparison voxels.

27. A method according to claim 26, wherein calculating the similarity measure comprises calculating a value of a feature of the neighborhood of said voxel and calculating a value of a corresponding feature of the neighborhood of the comparison voxel.

* * * * *